(12) United States Patent
Barratt et al.

(10) Patent No.: US 7,032,410 B2
(45) Date of Patent: *Apr. 25, 2006

(54) COMPRESSOR SYSTEMS FOR USE WITH SMOKELESS LUBRICANT

(75) Inventors: Thomas Barratt, Myersville, MD (US); William McQuade, New Cumberland, PA (US)

(73) Assignee: York International Corporation, York, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/922,526

(22) Filed: Aug. 20, 2004

(65) Prior Publication Data

US 2005/0022551 A1    Feb. 3, 2005

Related U.S. Application Data

(62) Division of application No. 10/263,871, filed on Oct. 10, 2002.

(51) Int. Cl.
*F25B 43/02*    (2006.01)

(52) U.S. Cl. .......................................... 62/473; 62/471

(58) Field of Classification Search .................. 62/471, 62/503, 509, 512, 470, 473, 85, 84
See application file for complete search history.

(56) References Cited

U.S. PATENT DOCUMENTS

| | | |
|---|---|---|
| 3,955,945 A | 5/1976 | Bauer |
| 4,359,329 A | 11/1982 | Willeitner |
| 4,666,473 A | 5/1987 | Gerdau |
| 5,486,302 A | 1/1996 | Short |
| 5,595,678 A | 1/1997 | Short et al. |
| 5,612,299 A | 3/1997 | Short |
| 5,735,139 A * | 4/1998 | Lord et al. ..................... 62/470 |
| 6,206,953 B1 | 3/2001 | Bangs |
| 6,374,629 B1 | 4/2002 | Oberle et al. |

FOREIGN PATENT DOCUMENTS

FR    2807825    10/2001

OTHER PUBLICATIONS

Jill Oberle and Tom Rajewski, The Development of Lubricants for Ammonia Refrigeration Systems, CPI Engineering Services, Midland, Michigan, HAR 19th Annual Meeting, Mar. 23-26, 1997, p. 51-53.
ACS Mist Eliminator Design Manual, ACS Industries pp. 2-15.

* cited by examiner

*Primary Examiner*—Chen Wen Jiang
(74) *Attorney, Agent, or Firm*—McNees Wallace & Nurick LLC

(57) ABSTRACT

A compression system including a compressor driven by a motor, an optional accumulator, a liquid/gas separator, heat exchangers in the form of a condenser and an evaporator, expansion valves and conduit in the form of piping to connect these components together. The liquid/gas separating means is a lubricant separator, typically a cylindrical horizontal or vertical vessel used in conjunction with a gas compressor. The lubricant separator accepts discharge flow from the compressor which includes a mixture of a "smokeless" lubricant and refrigerant gas in a range of particle sizes forming a fluid stream, separates the refrigerant gas from the lubricant and collects the lubricant for reuse in the compressor. Because the lubricant used in the lubrication system rapidly agglomerates into larger size droplets and does not produce an aerosol, the separator does not require a coalescer element to coalesce aerosol and does not require a manway for serving the coalescer element. The coalescer element is replaced with a more reliable and durable mesh pad to agglomerate the larger sized droplets. The overall size and space requirements associated with the separator are reduced.

14 Claims, 10 Drawing Sheets

| Oil Group | Refrigerant | | | | | | | | | | | | | | | |
|---|---|---|---|---|---|---|---|---|---|---|---|---|---|---|---|---|
| | Amonia | CFC | CFC | CFC | HCFC | HFC | HFC | HFC | HFC | HFC | HC Propane | Propylene | Ethane | Methane | Landfill Gas | Carbon Dioxide |
| | R717 | R12 | R114 | R502 | R22 | R23 | R134a | R404A | R410A | R507 | R290 | R1270 | R170 | R50 | | R744 |
| Mineral | | C | C | C | C | C | | | | | | | | C | C | |
| Alkyl Benzene | | | | C | C | | | | | | | | | | | |
| PAG | | | | | | | | | | | | C | | C | C | |
| PAO | C | | | | | | | | | | | C | | | C | C |
| POE | | | | | | C | C | C | C | C | | C | | | | |

FIG-9

COMPRESSOR SYSTEMS FOR USE WITH SMOKELESS LUBRICANT

CROSS-REFERENCE TO RELATED APPLICATIONS

This application is a divisional of Application No. 10/263,871 filed Oct. 10, 2002.

FIELD OF THE INVENTION

The present invention is directed to compressor systems for use with smokeless lubricants, and specifically compressor systems utilizing positive displacement compressors with smokeless lubricants.

BACKGROUND OF THE INVENTION

Positive displacement compressors are machines in which successive volumes of air or gas are confined within a closed space and elevated to a higher pressure. The pressure of the gas is increased while the volume of the closed space is decreased. Positive displacement compressors include, for example, reciprocating compressors, rotary compressors, scroll compressors and screw compressors. Screw compressors, also known as helical lobe rotary compressors, including single screw compressors, male-female (double) screw compressors and other variations, are well-known in the air compressor, refrigeration, water chiller, and natural gas processing industries. These compressors rely on lubricating oil to lubricate rotating and contacting surfaces to allow for efficient operation, to prevent damage to the units and to seal the lobes containing the volume being compressed.

Reciprocating compressors utilize a movable piston in a cylinder. The piston is attached to a connecting rod which is attached to a crank. An electric motor drives the crank which causes the piston to reciprocate within the cylinder, increasing and decreasing the volume within the cylinder. Fluid is introduced into the cylinder through a valve when the piston is at the bottom of its stroke. The fluid is compressed as the piston moves toward the top of its stroke and is removed from the cylinder through a valve when the piston is at the top dead center (TDC) its stroke. Lubricant is utilized to lubricate the bearings, the cylinder walls, piston walls, piston rings, if utilized, and piston pins. Smaller reciprocating compressors are usually sealed units and entrainment of lubricant in the compressed refrigerant usually is not a problem. However, for larger reciprocating compressors, lubrication loss can present a problem.

A scroll compressor generates a series of crescent-shaped pockets between two scrolls, the crescent-shaped pockets receiving fluid for compression. Typically, one scroll is fixed and the other orbits around the fixed scroll. As the motion occurs, the pockets between the two forms are slowly pushed to the center of the two scrolls. This reduces the fluid volume. Lubrication is used to lubricate the main bearings and seal surfaces along and at the edge of the scrolls.

Rotary compressors are of two general types: stationary blade and rotating blade compressors. The blades or vanes on a rotating blade rotary compressor rotate with the shaft within a cylindrical housing. In a stationary blade compressor, the stationary blade has a blade that remains stationary and is part of the housing assembly, while a cylinder rotates within the housing assembly, via a roller on an eccentric shaft within the cylinder. In both types, the blade provides a continuous seal for the fluid. Low pressure fluid from a suction line is drawn into an opening. The fluid fills the space behind the blade as it revolves. The trapped fluid in the vapor space ahead of the blade is compressed until it can be pushed into the compressor exhaust. A film of lubricant is required on the cylinder, the housing, roller and blade surfaces as well as on the bearings. Lubricant can readily become entrained in the refrigerant.

A screw compressor generally includes two cylindrical rotors mounted on separate shafts inside a hollow, double-barreled casing. The side walls of the compressor casing typically form two parallel, overlapping cylinders which house the rotors side-by-side, with their shafts parallel to the ground. Screw compressor rotors typically have helically extending lobes and grooves on their outer surfaces forming a large thread on the circumference of the rotor. During operation, the threads of the rotors mesh together, with the lobes on one rotor meshing with the corresponding grooves on the other rotor to form a series of gaps between the rotors. These gaps form a continuous compression chamber that communicates with the compressor inlet opening, or "port," at one end of the casing and continuously reduces in volume as the rotors turn and compress the gas toward a discharge port at the opposite end of the casing. Lubricant is introduced into the compressor to lubricate the bearings, shaft seal and rotors, to help seal the clearances between the screws during operation of the compressor, to help remove the heat of compression thereby preventing the lubricant from overheating and to help reduce the noise associated with compressor operation.

Common to each type of compressor is an inlet and an outlet. A compressor inlet is sometimes also referred to as the "suction" or "low pressure side," while the discharge is referred to as the "outlet" or "high pressure side."

Screw compressor rotors intermesh with one another and rotate in opposite directions in synchronization within a housing. The rotors operate to sweep a gas through the housing from an intake manifold at one end of the housing to an output manifold at the other end of the housing. Commercially available screw compressors most commonly include threaded shafts or helical rotors having four lobes, however, others have been designed to have five or more lobes, and rotors may have any number of lobes, for example from 3–9 lobes. Male and female rotors typically have different number of lobes. The rotor shafts are typically supported at the end walls of the casing by lubricated bearings and/or seals that receive a constant supply of lubricant from a lubricant circulation system.

Lubricants typically are some type of oil-based liquid compound, this part of the compressor system often being referred to simply as the "lube-oil" system. Compressor lube-oil systems generally include a collection reservoir, filter, and pressure and/or temperature sensors. The lube-oil may be circulated as a result of the pressure differential in the system across the evaporator and condenser, such as in water chiller screw drive compressor system, or the lube-oil may be circulated by a motor driven pump such as in larger reciprocating compressors. Since many lubricants degrade at high temperature by losing "viscosity," compressors operating at high temperatures, such as with screw compressors, generally include specially formulated lube-oil systems and also include a cooler for reducing the temperature of the lubricant before it is recirculated to the seals and bearings. So-called "oil flooded" screw compressors further include means for recirculating lubricant through the inside of the compressor casing. Such "lube-oil injection" directly into the gas stream has been found to help cool and lubricate the rotors, block gas leakage paths between or around the rotors, inhibit corrosion, and minimize the level of noise produced by screw compressors.

As is evident in these positive displacement type compressors, lubricant and fluid in the gaseous state being compressed together, are mixed as a result of compressor operation. Under these high pressures and temperatures, the lubricant forms droplets. These droplets typically are entrained in the gas stream and must be removed before the compressed gas, typically a refrigerant, is transported away from the compressor. When these droplets are very fine, typically smaller than about 1 micron, they form an aerosol which is entrained within the refrigerant gas. These aerosols do not readily coalesce and are not readily removable from the fluid stream without inclusion of special aerosol-removing equipment such as coalescers, which is a part of a separator portion of a compressor system. In one alternative for closed systems, the aerosols can be allowed to move downstream with the compressed gas, since the aerosol will eventually be returned to lubricate the compressor. Of course, this requires additional lubricant in the system to accommodate the volume of lubricant that is always absent from the compressor, which adds to the cost of operation since lubricant is expensive. Furthermore, the presence of the lubricant in other parts of a closed system can lead to the downstream equipment not operating efficiently. For open systems, the lubricant is lost downstream as aerosol which is never returned and must be replenished.

A typical screw compressor mixes together lubricant and refrigerant, discharging a high-pressure and high-temperature fluid stream consisting of a mixture of compressed gas and oil. The oil at the high temperatures and pressures will form droplets across the size range set forth above, including in the aerosol range, 1 micron and smaller. Without aid, the entrained aerosol does not tend to coalesce and form droplets that can be removed easily from the compressed gas. As a result, coalescers are included in separators to remove the aerosol to prevent the lubricant from being carried downstream of the compressor. Even with coalescers, a very small amount of exceedingly fine droplets escapes downstream. If a sufficient volume of oil is removed from the compressor, the compressor undesirably can be depleted of oil.

For designs in which excess oil is not utilized, the oil must be kept within the compressor. The oil must be separated from the high pressure refrigerant gas before the refrigerant gas is discharged into the chiller or refrigeration system, which entails the agglomeration of the finely-divided aerosol.

As noted above, to prevent the lubricant from being entrained in a fluid moving downstream, the prior art employs a compressor having a separator section. The compressed gas may be forced to follow a tortuous path or contact a surface where larger droplets can agglomerate and can be cycled back into a sump-type device for reuse, lubricating the moving parts of the compressor. To capture the finer aerosol, that are not agglomerated into droplets of sufficient size to be separated, the separator section may employ a coalescer or filter unit through which the aerosol must pass before discharge of the compressed gas downstream of the separator. While these designs are effective in agglomerating the oil and minimizing the loss of oil to the chiller system, the compressed fluid undergoes a pressure loss as the mixture of aerosol, which resembles a smoke, passes through the coalescing device. This pressure loss is directly related to system performance, reducing the efficiency of the unit. A typical coalescer element comprises a series of filters providing high surface area made of mesh microfiber materials or system filters, which also increase the size of the system. In applications where space is not a consideration, the size of the system is not an important factor, but pressure drop remains a concern, although a larger vessel can be placed in the same volume of space. However, in most applications, space is a consideration, and the separator occupies space that could be otherwise utilized. Elimination of the coalescer elements would permit installation of either a larger separator within the same space, allowing for larger compressor systems, or systems can be designed with the same capacity, but less space. In addition, the efficiency can be improved as the pressure drop associated with coalescers can be removed from the system. Compounding this situation, units that include a coalescer element typically provide access to the interior so that internal filters and passageways can be maintained. Such access, usually provided through a manway, requires yet additional space for access. In addition, the access requires an additional penetration into the system that must be appropriately sealed with a suitable gasket. However, this gasketed joint undesirably provides a potential leak path. A further disadvantage is the additional cost associated with manufacturing the structures that house the coalescer element.

A method that has been suggested to eliminate the coalescer is the use of non-smoking lubricants. The term non-smoking lubricant means a lubricant that does not form an aerosol, or, in the alternative, one that forms an aerosol whose submicron-sized and micron-sized particles exist for a very short time and which can be readily manipulated to coalesce into droplets of sufficient size that can easily be segregated from the compressed gas within the working volume of a separator without the use of a coalescer. These non-smoking lubricants have found application as machining/cutting oils to minimize the inhalation exposure of machine operators to such oils. While these lubricants have been proposed for use with compressor systems, none of the lubricants has found commercial application for use with refrigerants typically used in compressor systems. These lubricants also tend to be more expensive, and their use in existing positive-displacement type compressor systems, such as screw compressor systems have provided no distinct advantages to justify their increased cost.

One lubricant that has been proposed for use is set forth in U.S. Pat. No. 3,805,018 which sets forth a stray mist suppressant that includes oil-soluble polyolefins of viscosity average molecular weight greater than 5,000. Another is set forth in U.S. Pat. No. 5,756,430 which teaches a mist oil lubricant based an polycarboxylic acid ester to which is added 1–5% polyisobutylene Mn 400–2500 as a stray mist suppressant. While both of these teach the formulations of potential smokeless oils, neither of these recognize the full potential for enhanced system performance and equipment improvement resulting from the use of such a smokeless oil except as a direct substitute for existing lubricants in existing systems.

Similarly, U.S. Pat. Nos. 4,916,914 and 5,027,606 to Short and assigned to CPI Engineering Services, Inc. disclose the use of a lubricant that will not readily dissolve in refrigerant at higher temperatures and pressures, but will readily dissolve in refrigerant at low temperatures and pressures. This can be accomplished by providing a refrigerant-lubricant combination at which there are substantially two phases at condensing temperatures and pressures, and, substantially one phase at evaporation temperatures and pressures. This combination permits the oil to be more efficiently separated from the refrigerant in the discharge region before the fluid is discharged into the chiller system downstream of the compressor. However, the patents do not recognize system improvements that can be engineered as a result of the use of such lubricants. These lubricants are polyether polyols or monols in combination with a non-chlorinated hydrocarbon refrigerant.

Present compression systems include separators used in conjunction with the compressors. The separators function to separate lubricant from refrigerant and have elements which perform the same functions, regardless of the type of lubricant that is utilized in the device. These separators have been designed for use with lubricants that mix with refrigerant gas to form a fluid that includes fine aerosols or "smoke" as they are discharged from the compressor. Current compression systems route the fluid from the compressor portion of the compressor through a small pipe into a large pipe, which typically discharges within the separator. As the fluid is discharged from the small pipe into a large pipe, there is a velocity change. The fluid impinges a wall of the separator and undergoes a change of direction, and again loses some velocity. With each surface that the fluid contacts, there is some energy loss and some coalescence of the lubricant droplets across the size spectrum of droplets. When the coalescing lubricant reaches a critical size, it separates from the refrigerant gas by gravity or momentum and drops to the bottom of the separator, which forms a main oil reservoir supply for the compressor, being cycled back from the separator to provide lubrication to the compressor. The remaining fluid passes through structure within the separator referred to as the coalescer element, where a substantial portion of the remaining aerosol coalesces into droplets on the fine material fiber with increased surface area, after which, by gravity, it falls into a coalescer reservoir associated with the coalescer element that is maintained at a lower pressure than the main oil reservoir. Oil is returned from the coalescer reservoir to the low pressure side of the compressor by a separate line. Fluid passing through the coalescer element then exits the separator and passes downstream of the compressor, which for a closed system entails passing into the remaining portion of the compression system. This fluid includes refrigerant and still may include a small amount of lubricant as very fine aerosol which has been able to pass through even the fine filter elements of the coalescer. Access to the internal mechanisms of the separator, when provided, is through a manway typically located in a head at one end of the separator adjacent the coalescer. This access is required as the coalescer elements may require periodic maintenance and replacement.

However, none of the prior art discloses the advantages that can be realized in the chiller systems by incorporation of the smokeless-type oils into the chiller systems. Smokeless lubricants, such as lubricants being developed by CPI, Inc of Midland, Mich., are described in copending patent application entitled A LUBRICANT AND COMPRESSOR WORKING FLUID COMPOSITION USEFUL FOR IMPROVING THE OIL SEPARATION PERFORMANCE OF A VAPOR COMPRESSION SYSTEM, assigned to Lubrizol Corp. of Cleveland, Ohio., filed on the same day as the present application. What is needed are compressor systems that incorporate modified structures with reduced sizes as a result of the use of smokeless type oils.

SUMMARY OF THE INVENTION

The present invention provides a compression system for use with positive displacement-type compressors that includes a liquid/gas separating means designed around a smokeless lubricant that has excellent coalescing characteristics to permit the agglomeration of lubricant entrained in compressed gas within the working volume of the separating means at compressor exit temperatures and pressures without the use of a coalescer, so that the number of particles of finely divided lubricant classified as aerosol entrained in the compressed gas exiting the separating means is substantially reduced. Because the number of particles is substantially reduced, below 700 ppm and the particles are small, the volume and weight of exiting lubricant is necessarily reduced.

The separating means, or separator, is divided into several stages. As used herein, the separating means or separator is considered and discussed as being part of or a portion of the compressor. However, this is not meant to be limiting, as the compressor and separator may be considered as two separate components joined by any suitable connection means including but not limited to pipe, tubing and interfacing flanges. Typically, the first stage of the separator is an impingement or momentum-based portion that eliminates substantially all of the large droplets of entrained lubricant, typically, about 70 microns and larger, from the compressed fluid by impingement or momentum. The second stage is designed to remove the remaining lubricant which includes a combination of entrained droplets in the size range of about 5 to 700 microns. The flow exiting the second stage primarily includes droplets in the submicron size range, that is in the size range of 5 micron and less. Typically the coalescer portion downstream of the second stage utilizes very fine filters, usually fibrous filters, to remove aerosol, droplets in the submicron range of 1 micron and less. Of course, the fine filters will also remove the particles in the size range of 1 to 5 microns.

The "smokeless' lubricant utilized in the present invention typically includes additives, including an additive that promotes the agglomeration of substantially all droplets into sizes larger than about 0.6 micron, and typically about 5 microns or greater. Droplets entrained in a fluid stream having a size of about one micron and smaller are generally and interchangeably referred to as fog, aerosol, mist or "smoke" when present in large numbers. However, as used herein, "aerosol" refers to particles having a diameter of about 1 micron and smaller (submicron particles), while "mist" refers to droplets having a size distribution in the range of about 70 microns down to about 1 micron. "Smoke" refers to a large number of particles of mist or aerosol, either alone or in combination that provides the appearance of smoke. The lubricant additives may also include antioxidants, pour point depressants, corrosion inhibitors, foam inhibitors, VI improvers, etc. so as to provide the lubricant with desired properties.

The nature of the lubricant and additive hereinafter referred to simply as "lubricant" is to change the size distribution of droplets between the first stage of the separator and the separator exit so that there are fewer and larger droplets. As used herein, a stage in the separator acts on the fluid stream to modify a characteristic of the stream, typically by acting on lubricant droplets within a preselected size range. The change in size distribution and number of the particles in the fluid stream by the lubricant of the present invention is such that a coalescer portion that includes fine strands of fabric of multifilament yarn such as fiberglass, Kevlar fibers and the like, knitted into a mesh (co-knit pads) as a filter currently utilized in the art can be eliminated and replaced, for example, by a series of fixed plates or a coarse mesh screen or sequence of coarse mesh screens, since the "smokeless" lubricant modifies the number and size distribution of the particles in the fluid stream to eliminate substantially all of the very fine particles, and thus eliminate the need to have fine coalescer elements to agglomerate these fine particles. The co-knit pads having fiber spacings fractionally larger than the submicron droplets, a mil or less to a few mils, can be replaced with mesh screens or plates with no fibers and having spacings at least 10 times as great. The number and size distribution of the particles is such that the fixed plates or coarse mesh screen can satisfactorily agglomerate the particles having a larger size distribution and eliminate the appearance of "smoke." Ideally, the "smokeless" lubricant should be "smokeless" (i.e not have the appearance of a smoke) after passing through the first stage of the separator, but before passing into the final stage of the separator, that is to say, the droplets are aggregated into sizes sufficiently large to be removed readily from the fluid stream in the final stage of the separator, a fewer total number of particles having a distribution of sizes in the range of about 5 microns and larger, and only a few number of particles having a smaller diameter (5 microns and less), so that separation substantially can be accomplished with fixed plates or coarse mesh screens.

A compression system typically includes a compressor driven by a motor, an optional accumulator, a liquid/gas separator, heat exchangers in the form of a condenser and an evaporator, expansion valves and conduit in the form of piping to connect these components together. The liquid/gas separating means is a lubricant separator, typically a cylindrical horizontal or vertical vessel. The lubricant separator which may have a plurality of stages is used in conjunction with a gas compressor. The lubricant separator accepts discharge flow from the compressor. This discharge flow includes a mixture of lubricant and refrigerant gas in a range of particle sizes forming a fluid stream. The separator separates the refrigerant gas from the lubricant. The separated lubricant is collected within the separator and stored for reuse to lubricate the moving parts of the compressor, typically the compressor bearings.

The separator of the present invention accepts fluid discharged from the compressor. However, because the lubricant used in the lubrication system is designed to be "smokeless", that is, to rapidly coalesce into fewer but larger sized droplets or particles, the separator of the present invention does not include a coalescer element for removing aerosol, nor does it require a manway, since access into the coalescer element is no longer required. This reduces the size required for the separator and the space required for servicing. The costs associated with fabrication and operation are also reduced.

In operation, the separator of the present invention is a cylindrical vessel that accepts compressed fluid discharged from the compressor. This fluid undergoes a velocity change as the compressed fluid passes from a small pipe into the large cylindrical vessel that could be considered a large pipe. Upon entering the vessel, the fluid undergoes a directional change as it contacts a wall in the first stage. This wall may be one of the cylindrical walls of the vessel. Some of the lubricant coalesces due to the velocity changes and some additional lubricant agglomerates on the wall due to contact. The fluid passes into a second stage through a coarse mist eliminator, for example, an optional vane mist eliminator, where lubricant substantially in the large size of the size distribution coalesces on the large surfaces of the coarse mist eliminator or vanes in a vane mist eliminator, located in the gas flow path. Plates or a coarse mesh may also be utilized. The fluid continues the traverse through the cylindrical separator passing through a mist eliminator where substantially the remainder of the lubricant, which is primarily in the fine size of the size distribution, is agglomerated on a fine mesh surface. Although submicron aerosols may still bypass the mist eliminator and exit the separator downstream into the condenser, the number of these submicron aerosol particles is substantially reduced as a result of the coalescing properties of the lubricant, resulting in a shift in the particle size distribution to larger sizes. All of the coalesced lubricant settles into a sump associated with the separator. The mesh surface is comprised of a corrosion resistant material having some rigidity, such as stainless steel or plastic monofilament. The compressed fluid, which does not have to pass through the coalescer element and undergo the accompanying pressure drop, then exits the separator and is transported via a conduit to the next component in the compression cycle. In chiller systems, the next component is the condensing stage.

An advantage of the present invention is that the use of a smokeless oil minimizes or eliminates the formation of an oil aerosol within the compressor. This in turn minimizes or eliminates the likelihood that aerosol will be carried out by the fluid stream into the remainder of the compression system, such as heat exchangers, thereby reducing the efficiency of the heat exchangers. Thus, structures designed to capture or remove aerosol can be eliminated from the compressor and heat exchanger operation can be made more efficient.

An advantage of the present invention is that the separator can be made smaller as the coalescer element of the separator can be eliminated. Unlike the coalescer elements, which can be damaged in transit, can become fouled with debris in dirty environments or which can erode and deteriorate due to high velocity discharge gas, the mesh mist eliminators, not being as fine and delicate, are not subject to such problems. Since the mesh screens do not require such routine maintenance, access to the interior of the separator, such as through a manway can be eliminated along with the coalescer element, further reducing the size of the separator.

Another advantage of the present invention is that the fluid passing through the separator does not undergo a pressure drop as great as the prior art separators. The pressure drop associated with entering and passing through the coalescer element is eliminated. Because the overall pressure of the fluid exiting the separator is higher, the overall efficiency of the system is improved.

Yet another advantage of the present system is that less lubricant escapes from the separator downstream into the remainder of the system. For open systems, this translates into less lubricant replacement required to maintain operation of the system without subjecting the compressor to damage, and this directly translates to lower costs. For closed systems, even though some lubricant may escape into the system downstream into those downstream components, this lubricant will eventually cycle through the system. However, more lubricant remains within the separator for use by the compressor. This also translates into lower costs as less lubricant is required to be added to the system.

Still another advantage of the present invention related to less lubricant in the form of fine droplets (aerosol) escaping from the separator downstream into the remainder of the system is that evaporator performance is improved. Lubricant collecting in the evaporator adversely affects the performance of the heat transfer surface in the evaporator, decreasing its efficiency. In the present invention, because more lubricant is "captured" in the separator, and less lubricant "escapes" downstream in the form of finely divided droplets (aerosol), there is less oil in the evaporator to foul the evaporator, resulting in better heat transfer and improved efficiency.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 9 is a chart of commercially available refrigerant systems identifying refrigerant category and oil type.

DETAILED DESCRIPTION OF THE INVENTION

Figure 1:
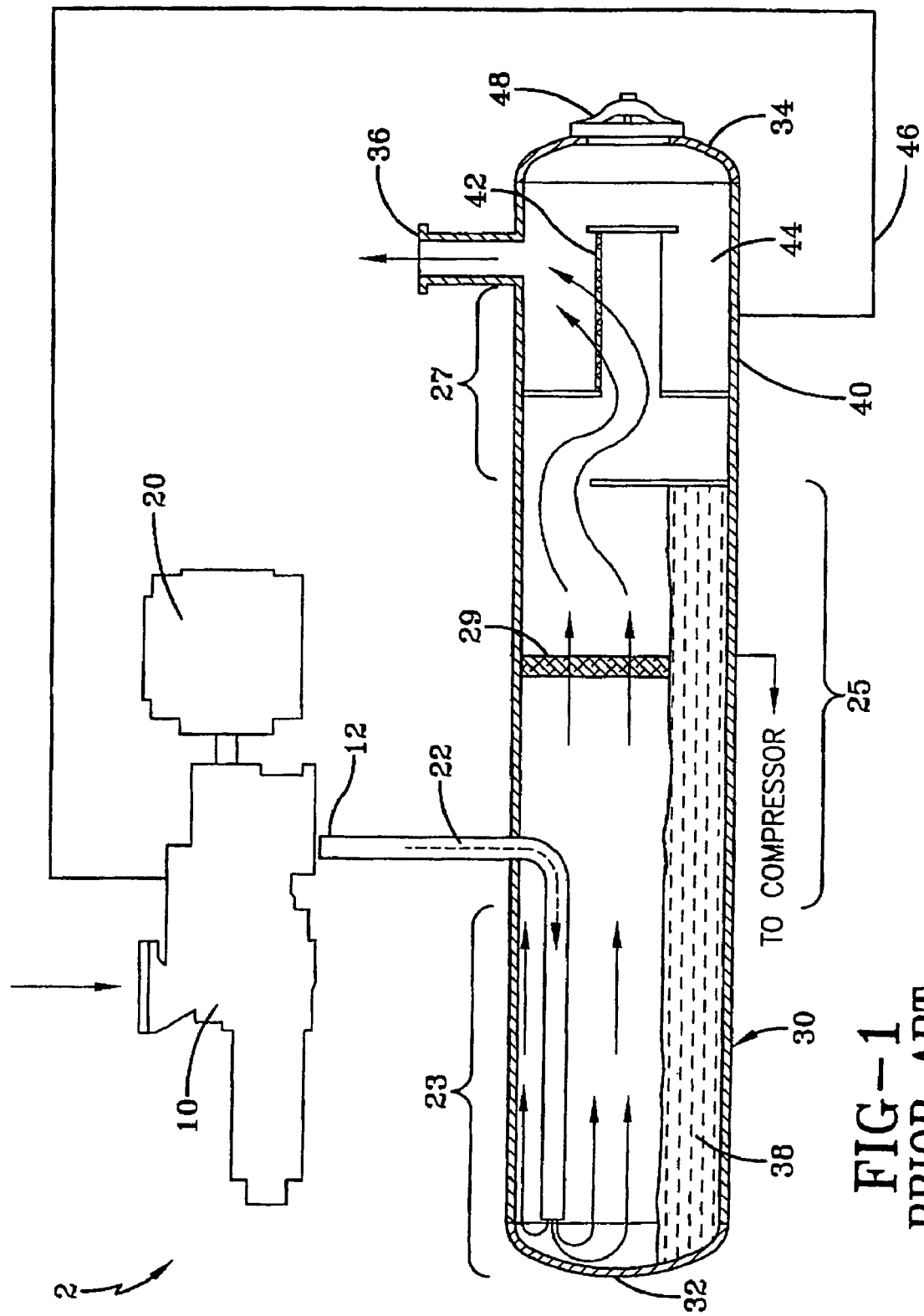
FIG. 1 is a schematic of a portion of a prior art compressor system utilizing conventional lubricants.

The present invention sets forth improved designs for compression systems that are used with smokeless or non-aerosol forming lubricants. These lubricants are characterized by additives that promote rapid coalescence of very fine droplets into larger droplets so that an aerosol of lubricant is not carried downstream of the compressor system. The compressor system is defined to include a separator or separator portion whose function is to remove lubricant from the gas compressed by the compressor or compressor portion. The separator may be an integral part of the compressor or it may be a separate unit attached to the compressor. As used herein, the term aerosol refers to very fine droplets of lubricant having an average diameter of about 1 micron and smaller, and typically from about 1 micron to about 0.1 micron, entrained in compressed gas, the aerosol further comprising compressed gas having at least about 1500 parts per million (ppm) of such lubricant droplets. In a closed loop system, the compressed gas is typically a refrigerant. While the specific formulation of these smokeless lubricants is not important, the ability of these lubricants not to form aerosols is important.

Unlike existing compression system designs, the compression systems of the present invention take advantage of the rapid coalescing characteristics to provide changes in the structure of components of the separator or separator portion of the compression system to provide reduced cost, improved performance and space savings. The compression systems set forth herein include both new compression systems and retrofits to components of existing compressor systems. These new compression systems and retrofits to existing compressor systems must be used in combination with the non-aerosol forming lubricants, as the use of lubricants that generate an aerosol in the new or retrofitted systems will result in an excessive entrainment of aerosol, with a resulting loss of lubricant downstream, unacceptably degrade the performance of closed loop systems used for heat transfer, in some cases to the point of damaging the components of the system and increase the cost of operation of the system. And while these more expensive smokeless lubricants can be substituted in existing systems, there usually is no benefit for its use in such systems, as these systems cannot take advantage of the design and performance improvements obtainable with the new designs set forth herein. Thus, the use of smokeless lubricants in existing systems may be an unnecessary higher cost.

The systems of the present invention are designed to operate with smokeless lubricants that are compatible with refrigerant fluids, including commonly available refrigerants, but may be used with other compressible gases. The particular combination of lubricant with refrigerant fluid is important. Such a smokeless lubricant has reduced atomization characteristics in the size range of 0.3–10 microns by promoting the formation of larger sized particles when compressed with a compressible gas such as a refrigerant gas, thereby changing the number and overall particle distribution size of the lubricant entrained in the compressed gas. The lubricant typically includes a coalsceing agent as well as other additives added to the base lubricant. The additive may include antioxidants, pour point depressants, corrosion inhibitors, foam inhibitors or other inhibitors suitable for a specific application. While the smokeless lubricant may be miscible with the refrigerant fluid at low temperatures and pressures, typically in the range of about 10–50° F. and about 10–60 psia such as may be found on the suction side of compressors, the smokeless lubricant should be readily separable from the refrigerant fluid at higher temperatures and pressures, typically in the range of about 50–275° F. and 60–400 psia such as is found at the discharge side of compressors. A lubricant that initially can predictably avoid the formation of aerosols in the submicron size range, about 0.3–1 micron, up to about 10 microns during the compression cycle over the range of compressor temperatures and pressures and which rapidly coalesces into larger droplets makes some existing structures unnecessary and permits their elimination. The apparatus of the present invention take full advantage of the reduced atomization characteristics of the lubricant, the overall upward shift in initial lubricant particle size distribution and rapid agglomeration of many small particles into fewer large particles to eliminate aerosol by promoting separation of the lubricant from the compressed gas without these existing structures, which become extraneous with use of such a lubricant. While the specific composition of such smokeless lubricants are not an important aspect of the invention, the functional performance of such lubricants permits modifications in the design and performance of the apparatus of the present invention.

Compression systems are used in a variety of applications such as refrigeration, or HVAC and in natural gas compression. In heat exchange applications, such as refrigeration or HVAC in which heat is transferred from a first location to a second location, the systems are generally closed systems. They typically include a compressor, a means for separating lubricant from refrigerant, optionally, means for storing refrigerant, means for storing lubricant for use by the compressor, a condenser to receive discharge from the compressor, expansion means, and an evaporator means that provides refrigerant to the compressor or the refrigerant storing means in a closed loop in which the various elements of the system are connected by suitable conduit. The various components of the system may be located in a very small area, within a few feet of each other, or may be separated by distances of ¼ mile or more.

A compressor system used with natural gas compression, such as for natural gas storage, may not include all of the components required for heat exchange applications. Moreover, such a system is an open system, since the compressed gas is stored in a storage facility and is not recirculated and returned to the compressor. While overall operation and design of the system, whether closed or open, is important to system operation, this invention is focused on compressing the compressible fluid and its associated components and their operation, that is, the compressor portion of the system, the lubrication of the compressor, the separation of the lubricant from the compressed gas and the reuse of the lubricant to lubricate the moving parts of the compressor.

Referring now to FIG. 1, a schematic of a portion of an existing screw compressor prior art system 2, which shows only a compressor 10, a motor 20 which may be integral with compressor 10 and a separator 30. Compressed fluid comprising refrigerant and entrained lubricant is compressed and exits compressor discharge port 12 where it is carried by conduit 22 into separator 30. Separator 30 is a horizontal separator in which the compressed fluid moves substantially axially (i.e. horizontally) through the separator and includes a first head 32, a second head 34, and a discharge port 36, although vertical separators are also used. Although separator designs may vary, this prior art separator is broken down into three stages, a first stage 23 where the direction of the fluid is changed, an optional second stage 25 where droplets are removed from the fluid stream and third stage 27 which includes at least one coalescer filter, and typically a series of filters for removal of aerosol, each filter being finer to capture particles of smaller diameter than the preceding filter. The large surface areas of the coalescer element filters lower the low fluid velocity ultimately allowing the coalescer to work more effectively, but simultaneously reduce the efficiency of the system and increase the overall size of the separator. Second head 34 includes a manway 36 or headway that provides ready access to the coalescer element.

Compressed gas with entrained lubricant traveling at high velocity enters the first stage 23 of the separator through conduit 22 and exits the conduit 22. In this first stage 23 of the separator, the compressed gas expands on exiting the conduit, experiencing a velocity drop. The compressed gas includes entrained lubricant which has a random size distribution, the droplet size of the lubricant varying from greater than 1000 microns to submicron. This high pressure fluid then strikes a barrier, here first head 32 and undergoes a direction change as shown, moving at a velocity of about 2–3 feet per second (fps). A portion of the entrained lubricant, the larger droplets or small droplets agglomerated into large droplets as a result of contact with first head 32, separates as liquid into a bottom portion of separator 38 as they reach a critical size such that gravity draws them from the fluid stream, while a substantial portion of the remaining lubricant is smaller than the critical size. In the first stage, particles of about 70 microns or larger are agglomerated and are substantially removed by gravity. The remaining fluid includes droplets that are smaller and that remain entrained in the compressed gas as a combination of fine aerosol and a fine mist, the mist comprising droplets having a size distribution with a diameter in the range above about 1.0 micron to about 70 microns, with a very large number of particles in the submicron, or aerosol, range. The agglomerated lubricant may include a small amount of dissolved refrigerant. The liquid, which drops to the bottom portion of separator 38 or sump, acting as a main oil reservoir, is returned to compressor 10 where it lubricates the bearings and other moving parts. This lubricant is filtered and cooled before returning to the main compressor, which return may be accomplished by an additional component, a pump (not shown in FIG. 1), in some systems.

The fluid then moves into the second stage 25 of the separator. This stage removes additional lubricant droplets from the compressed fluid. This stage 25 removes additional droplets from the mist. A number of options are available for this stage, each of the options removing droplets of different sizes. One option is to utilize the length of the separator unit to remove droplets as they travel along the length of the separator. Of course, this option is of limited value in a separator of relatively short length. A second option utilizes a plate pack (not shown) in which the compressed fluid passes over a series of stationary plates. Lubricant droplets having a size in the range of about 15 microns to about 700 microns are removed from the stream, agglomerating on the plates as they pass over the plates. A few smaller particles and a few remaining larger particles may also agglomerate on the plates. Another option utilizes a mesh pad 29, typically a large metallic mesh structure through which the compressed fluid passes. As the fluid contacts the mesh structure, liquid droplets agglomerate on the structure. Mesh pads typically remove droplets in the range of about 5 microns and larger. Regardless of the structure selected for the second stage, the agglomerated lubricant drops to the sump with the lubricant removed in the first stage.

The fluid in the form of a compressed gas having entrained mist and aerosol then moves into the third stage 27 of the separator that includes a coalescer portion 40. The coalescer portion 40 of separator 30 includes at least one filter 42, and typically a series of filters of progressively finer mesh in the form of fibers. The coalescer portion 40 also includes a coalescer reservoir 44, a return line 46 from the coalescer reservoir 44 to compressor 10 and a manway 48 to provide access to the coalescer portion 40. Discharge port 36 of separator 30 is located in the coalescer portion 40 downstream of the filter or series of filters 42.

The purpose of the coalescer portion is to remove as much of the remaining lubricant from the compressed gas as possible, so that the lubricant can be returned to the compressor to perform its lubricating function, and the compressed gas can pass downstream of the separator, into a condenser if in an HVAC system, or into storage if a natural gas system, with as little entrained lubricant as possible. Thus, the coalescer must remove the remaining mist and as much of the aerosol as possible from the compressed fluid before it leaves the separator. As the gas with entrained mist and aerosol pass into the coalescer portion having at least one filter, the mist-like particles form droplets on the filter(s) 42 and drop into coalescer reservoir 44. The filter or series of filters 42 are comprised of fine mesh fibers, such as glass microfibers. These microfibers have sufficient surface area to drop the velocity of the gas and mist passing through it sufficiently so that the filters are effective to coalesce the mist into droplets which fall to the coalescer reservoir 44 as a liquid. The gas exiting the coalescer portion of a horizontal separator has a velocity that is reduced from about 2–3 feet per second (fps) at entrance to less than 0.5 fps, typically about 0.3 fps before reaching discharge port 36. The depth of the fiber bed is a balance between sufficient residence time for coalescence of the droplets into a liquid and avoidance of a significant pressure drop in the refrigerant gas. Too high a density of the glass fibers in the filters adversely affects the system operation by reducing its efficiency as the refrigerant pressure is reduced. Additionally, a problem with drainage can sometimes result. The glass microfiber filters are designed to remove lubricant from the gas stream by coalescing droplets in the aerosol as small as 0.3 microns into larger particles. But, there is a corresponding drop in pressure. It is also recognized that a small amount of aerosol, typically having an average size less than about 0.3 microns, can remain entrained in the compressed gas as it passes from the separator into the HVAC system with the gas. In a closed system, this lubricant will eventually be returned to compressor 10. However, in an open system, this lubricant is lost and must be replaced at periodic intervals in order to prevent damage to the compressor. In certain applications, a manway 48 is provided to provide access to the coalescer portion of the separator. This access is needed in some applications to provide for periodic maintenance and replacement of the filters.

Once the compressed gas has passed through the at least one filter 42, the gas exits the separator through discharge port 36 into a conduit for transference downstream for subsequent processing. The liquid agglomerated into coalescer reservoir 44, substantially lubricant that may include a small amount of dissolved refrigerant, is returned via return line 46 to the compressor, after filtering. Because the coalescer reservoir is the low pressure point of the separator 30, yet on the high pressure side of the system, the lubricant in the coalescer reservoir 44, being at a higher pressure than the pressure on the low pressure side (suction side) of the compressor, is returned by this pressure differential to compressor 10 where the lubricant is used to lubricate and seal moving parts of the compressor.

Figure 2:
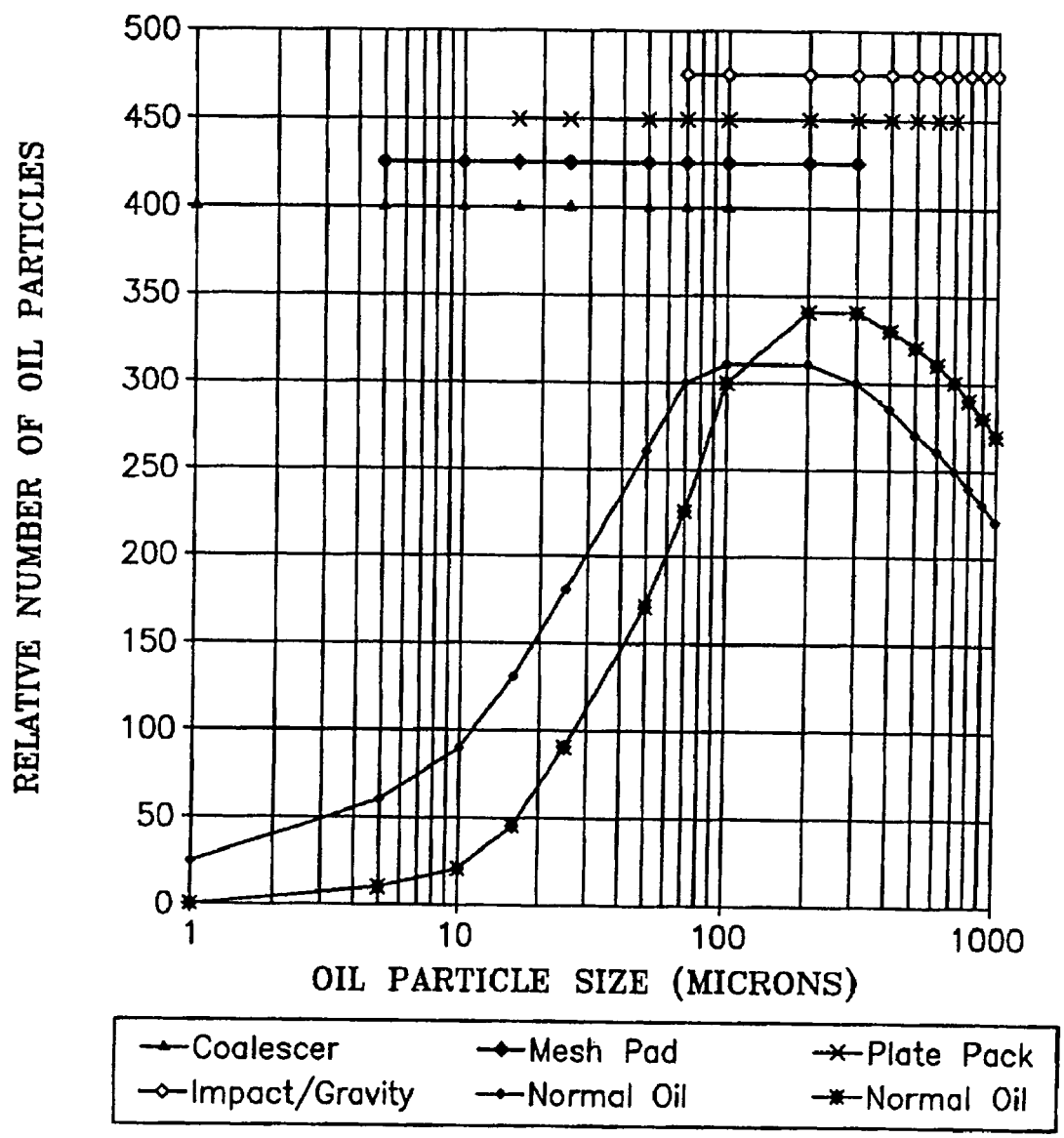
FIG. 2 is a graph showing the particle size distribution after compression of a compressed gas having an entrained "smokeless" lubricant and a compressed gas having an entrained existing lubricant.

The present invention is designed to be used with "smokeless oils" and permits the use of a separator that eliminates the third stage 27, or coalescer portion, of the separator. The smokeless lubricants reduce or eliminate "smoke" or aerosol entrained in the compressed gas as the fluid passes from the compressor through the separator. The elimination of this aerosol by coalescing many small particles into a few larger particles without the use of the separator third stage 27 is a characteristic property of such a lubricant fluid. As the lubricant fluid is compressed with the compressible gas and as the compressed gas with entrained lubricant passes through the separator, the size distribution of entrained lubricant particles in the entrained gas is modified and the particles more readily form fewer and larger droplets. The size distribution is such that the aerosol exists, if at all, for a short time. The size distribution of the droplets shifts as shown in FIG. 2. The left hand curve on the lower portion of FIG. 2 depicts a typical size distribution of entrained lubricant particles in a compressed fluid. As shown, a "smokeless" lubricant" has a curve which is shifted to the right. The average particle size is increased and the number of submicron particles is substantially reduced. Superposed over the distribution curves is a chart that indicates the size of particles removed by each of stage 1, stage 2 and stage 3 of the separator. As can be seen, the use of a "smokeless" type lubricant having virtually no submicron particles entrained in compressed gas and very few particles below about 5 microns, less than 700 ppm, more preferably less than 100 ppm and most preferably between 1 and 15 ppm entrained in compressed gas, permits the elimination of stage 3, the coalescer. While entrained lubricant liquid still must be separated from refrigerant gas, the separation is readily accomplished using stage 1 and stage 2 of the separator, while eliminating stage 3, thereby removing a significant pressure drop, resulting in a more efficient operation of the system. In many applications, the equipment required to agglomerate particles having a larger size distribution can be designed differently, allowing for the elimination of the coalescer portion and the fiber filters typically used. The equipment used for particle agglomeration is more reliable and requires no regular maintenance, so the manway positioned adjacent to the coalescer portion can be removed. Thus, not only can the separator be made smaller, but installation space for the separator can further be reduced as the additional space required to access the manway can also be eliminated, permitting this space to be used for other applications. In several of the examples that follow, the separator is described and depicted as a horizontal separator; however, horizontal separators can be used interchangeably with vertical separators, and include essentially the same operational elements. The choice of a horizontal or a vertical separator usually is based on space considerations.

EXAMPLE 1

Figure 3:
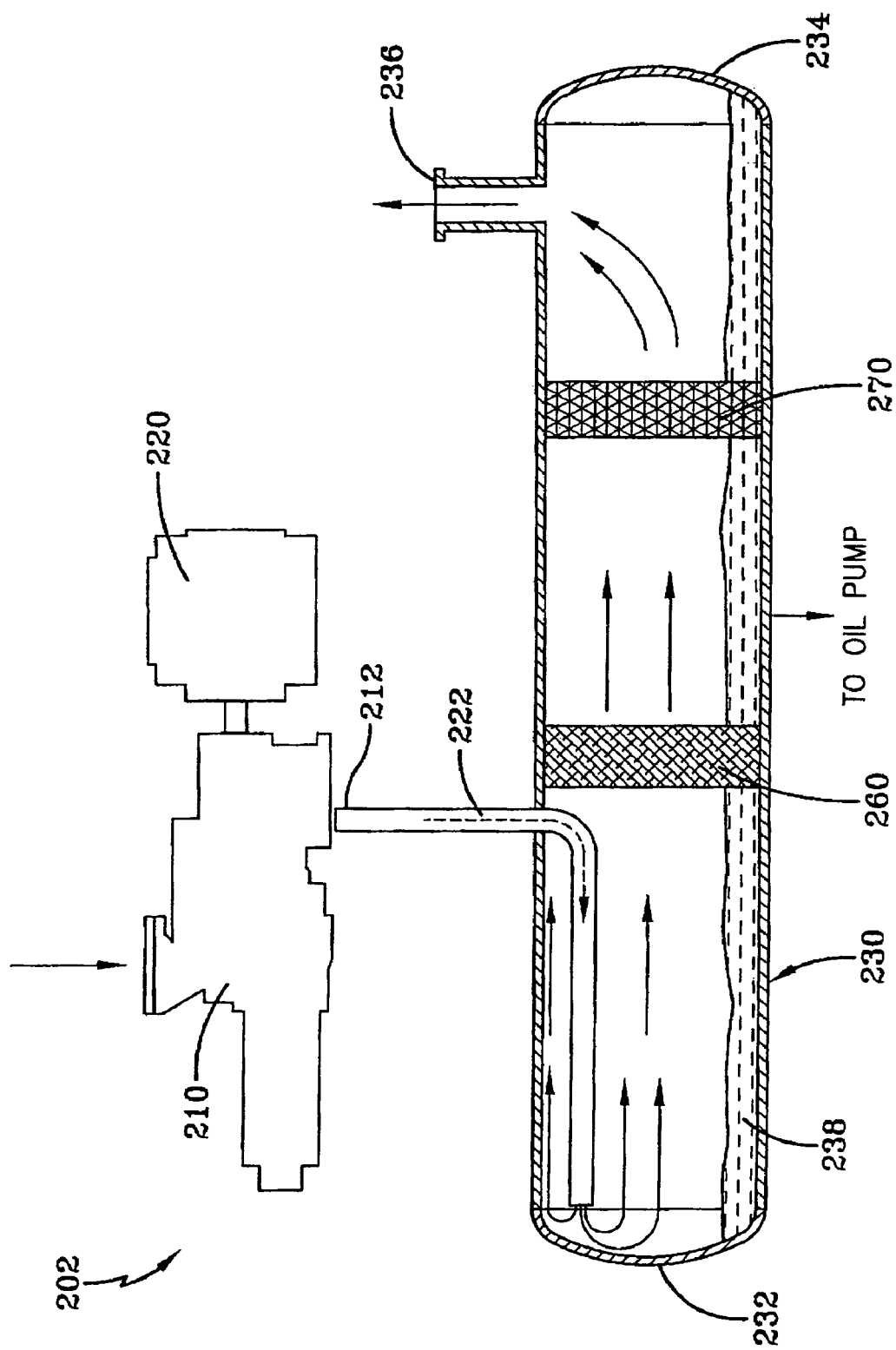
FIG. 3 is a schematic of a portion of a compressor system of the present invention utilizing a lubricant separator without a coalescer portion for separating smokeless oil from the gas stream.

An embodiment of the present invention designed to operate with "smokeless" lubricant is set forth in FIG. 3. A schematic of a portion of an existing screw compressor of the present invention 202 shows the compressor 210, the motor 220 which may be integral with compressor 210 and a separator 230, which eliminates the third stage 27 and thus the coalescer portion 40 utilized in the prior art practice. FIG. 3 is illustrative and is not meant to limit the present invention to screw compressors or to a particular type of screw compressor, and can include male/female screw compressors, single screw compressors or any variations of screw compressor technology. Compressed gas and entrained lubricant exits compressor discharge port 212 and is carried by conduit 222 into separator 230. Separator 230 is a horizontal separator and includes a first head 232, a second head 234, and a discharge port 236. Within separator 230 are an optional vane mist eliminator 260 and mesh mist eliminator 270. The vane mist eliminator is a first stage droplet agglomerator and is not as effective as the mesh mist eliminator in separating droplets from the fluid stream. Referring again to FIG. 2, a vane mist eliminator, which is effectively a plate pack, is useful in removing substantially all the droplets down to a size of about 15 microns, whereas a mesh pad or mesh mist eliminator can effectively remove droplets down to about 5 microns. Compressed fluid traveling at high velocity entering the separator through conduit 222 exits the conduit as in the prior art design. As the fluid expands on exiting the conduit, the fluid undergoes a velocity drop. This high pressure fluid then strikes a barrier, here first head 232, and undergoes a direction change as shown, again as in the prior art design. A portion of entrained lubricant is agglomerated as a result of contact with first head 232 and droplets having a size as small as 70 microns are separated into a bottom portion of separator 238. However, an aerosol typically does not form with "smokeless lubricants" or, if it does form, it is quickly eliminated in this first stage as the remaining particles agglomerate into larger sized droplets.

The entrained lubricant will include droplets below about 70 microns and a few droplets as small as about 0.3 micron that are carried in the gas flow. However, as indicated in FIG. 2, the size distribution of a substantial portion of the lubricant drops is large enough such that this small number of submicron droplets do not form a characteristic aerosol as do standard lubricants that must be removed else it be carried from the separator in the compressed gas flow. However, it is desirable that as many as possible of the remaining entrained droplets be removed from the flow of high velocity compressed gas before the gas leaves the separator unit. Because the average size of the particles in the particle size distribution is shifted to larger particle sizes with a fewer number of particles than with conventional, non-"smokeless" lubricants, different structures may be utilized effectively in removing these particles than in the prior art, as indicated in FIG. 2. In this embodiment, the compressed gas and entrained lubricant passes into stage 2. In this embodiment, stage 2 includes both a vane mist eliminator and a mesh mist eliminator. The larger droplets are removed by first passing through a vane mist eliminator, which is a circumferential structure in the flow path of the fluid having a plurality of radially oriented plates with passageways between the plates. The plates can be tapered airfoils designed to minimize the pressure drop of fluid flowing across them and to direct the flow of the fluid passing across the airfoils, such as to provide the fluid with a swirl, if desired. The vanes can be fixed or variable. If variable, the pitch of the vane can be varied with the velocity of the fluid. The lubricant droplets agglomerate on the plates of this vane mist eliminator. The vane mist eliminator can be constructed of any durable material, but metallic vane mist eliminators have been found to have a particularly long life, requiring little maintenance. The agglomerating lubricant droplets coalesce and fall into the reservoir 238. The vane mist eliminator can be effective in removing 99.9% of droplets larger than about 40 microns, and about 90% of droplets larger than about 15 microns. It is understood in these descriptions that the droplet distribution includes a large number of particles of various sizes. Even though a stage that includes a particular structure will remove a few particles smaller than in the discussed size range and substantially all of the particles within the discussed size range, statistically a very small number of particles, typically in the low end of the size distribution, may nevertheless bypass the structure.

The fluid passing through vane mist eliminator 260 may still include a few droplets larger than about 15 microns as well as droplets smaller than about 15 microns that must be removed. The fluid then is directed through a mesh mist eliminator 270. The mesh mist eliminator is comprised of one or two screens or pads. Wire mesh pads typically remove droplets having a size of about 5 microns and larger, and a few particles smaller than about 5 microns. The mesh pad can be designed to remove particles smaller than 5 microns, down to about 1–2 microns, but with an associated pressure drop. However, again referring to FIG. 2, the ability to coalesce finer lubricant particles is not necessary, as the size distribution of the particles in the "smokeless" lubricant is shifted so that the number of particles (and hence the weight percent of particles) less than about 5 microns is small. That is to say, the particles agglomerated in this "smokeless" lubricant are fewer and larger than in a non-smokeless lubricant and are not entrained in the gas as an aerosol, making them easier to separate from the gas stream by agglomeration on structures without passing the fluid through a material with fine strands having a large surface area. The number of particles smaller than 5 microns is significantly reduced because of the propensity of the lubricant to agglomerate, so that even if a few of these particles are not separated in stage 2 and escape downstream, these escaping particles comprise a very small volume fraction of the lubricant.

The agglomerated lubricant may include a small amount of dissolved refrigerant in closed systems used for cooling. The liquid in the bottom portion of separator 38, which acts as a main oil reservoir, is returned to compressor 10 where it lubricates the bearings and other moving parts. The lubricant is filtered, cooled and returned to the main compressor. A pump (not shown in FIG. 1) may be included in the return loop. The mesh pads should be effective in removing up to 99.9% of droplets having a size of 5 microns and larger, and are capable of capturing smaller droplets. The mesh pads can be constructed of any durable material, but metallic wire pads will have a particularly long life, requiring little maintenance. For this reason, the manway/handhole such as manway 48 in second head 34 of the prior art can be eliminated. The mesh openings can vary, but mesh openings should have a mesh size sufficient to provide the necessary separation of particles of 5 microns and larger from the fluid. To accomplish this separation, the mesh size can be as small as 0.01". When plates are used to remove the entrained droplets, the plate separation in a typical mechanical separation device can vary from 0.1" to 0.5". Both mesh and plate provide the additional surface area required for agglomeration of the lubricant droplets. The agglomerating lubricant droplets coalesce and fall into reservoir 238. Although there is some pressure drop through a mesh mist eliminator 270 designed to remove 5 micron droplets, the pressure drop is not so severe so as to require a separate reservoir of the fluid agglomerated from the mesh mist eliminator, as is required in the prior art devices utilizing a third stage coalescer. All of the agglomerated fluid flows by gravity into reservoir 238 and can be returned to lubricate compressor 210 after filtering and cooling as in the prior art. Thus, the additional structure required to filter and direct coolant from the third stage coalescer back to the low pressure portion of the compressor, as required in the prior art design, also can be eliminated in the design of the present invention used in conjunction with "smokeless" lubricant.

Figure 4:
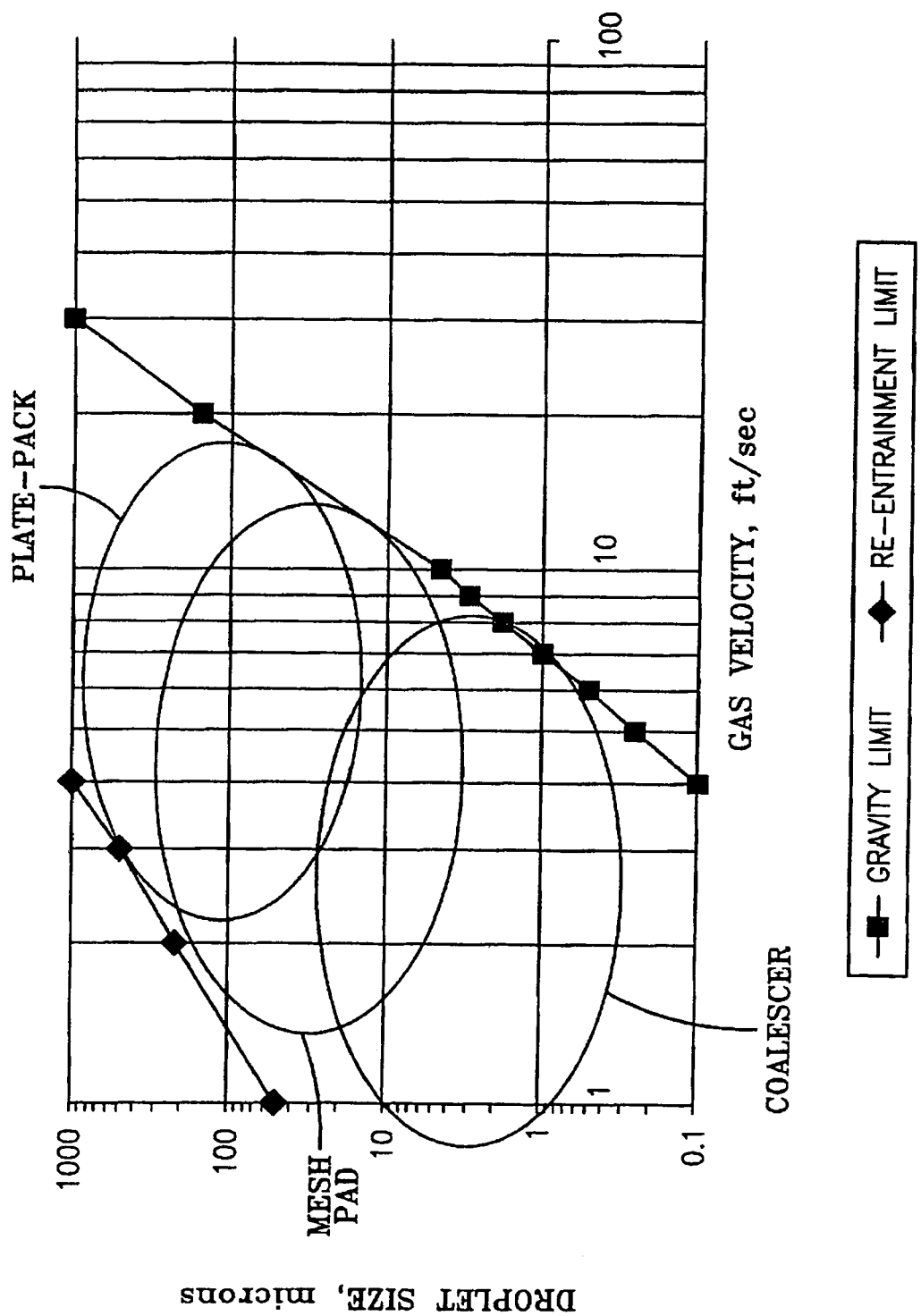
FIG. 4 is a graph showing the effectiveness of various lubricant droplet separation mechanisms as a function of fluid velocities and particle sizes.

To further understand the inter-relationship between droplet sizes, gas velocities and structures for separating droplets from the gas stream, reference is made to FIG. 4, which represents gas velocity vs. droplet size. As can be seen from FIG. 4, as entrained droplets become larger and move more slowly, they are more easily removed from the gas stream. This is represented by the curve at the upper left side of FIG. 4. Conversely, small particles moving quickly re-entrain in a gas stream as represented by the curve at the lower right of FIG. 4. Superposed over this graph are typical droplet removals for stage 2 and stage 3 structures. A plate pack, such as vane mist eliminator 260, can be effective in removing large droplets. The third stage coalescer 40 is effective in removing aerosol, while mesh mist eliminator 270 is intermediate between these two in removing droplets. For a system in which a lubricant produces aerosol, that is to say, submicron droplets, it is necessary to include a third stage structure that eliminates these submicron droplets, such as coalescer 40. However, when a lubricant can form larger droplets while avoiding the formation of an aerosol, then structures such as mesh mist eliminators 270 and vane mist eliminators 260 can be utilized to remove entrained lubricant and the third stage coalescer portion 40, which is more costly and requires more maintenance, can be eliminated.

A screw compressor system of FIG. 1 can be operated using a currently available refrigerant system. The third stage coalescer filter is removed and replaced with a vane mist eliminator and a mesh mist eliminator, so that the separator was configured as shown in FIG. 3. However, the lubricant in the refrigerant system is replaced by a "smokeless" lubricant in this configuration. The "smokeless" lubricant replacement is available from CPI of Midland, Mich. This "smokeless" lubricant is known to be a mineral-based oil with unknown additives designed for use with an ammonia-based system such as commercially available FRICK #9. A listing of commercially available refrigerant systems is provided in FIG. 9 which identifies refrigerant type and lubricant type as well as common designations. For comparison purposes, the compressor system should be run under identical conditions for each test. The performance of the system is based on the lubricant content in the refrigerant at the discharge port of the separator and may vary depending upon the lubricant selected. A test was performed on a separator using a lubricant that forms an aerosol with the coalescer filters installed and with the coalescer filters removed. With the coalescer filters installed, about 6 ppm lubricant was measured in the refrigerant gas at the discharge port. With the coalescer filters removed, about 1000–1500 ppm lubricant was measured in the refrigerant gas at the discharge port, although the discharge pressure was significantly higher, since the fluid pressure was not reduced by passage through the third stage coalescer filters. Using a smokeless lubricant of the present invention and with the separator configured as shown in FIG. 3, that is, without a third stage, a maximum of 10 ppm is allowed in the refrigerant at the discharge port so as to duplicate the performance of a conventional lubricant with a third stage. This value is statistically insignificant from the 6 ppm measured with the third stage coalescer installed. In an open circuit system, such as used above in the compression of natural gas, 10 ppm max. at the discharge port is considered an acceptable amount of lubricant but more typically 6 ppm is preferred. This allowable amount in an open circuit differs from a closed loop system such as a chiller, where an acceptable amount of lubricant at the discharge port is 500 ppm and preferably 300 ppm. Because of concerns with evaporator efficiency, as previously discussed, it is desirable to minimize the amount of lubricant at the discharge port. However, in this open loop system, the pressure drop was significantly less than with the coalescer filters installed. The discharge pressure of the gas in this configuration should be similar to the discharge pressure of the gas with entrained aerosol having the third stage removed. The separator in a compressor system using a smokeless lubricant having a vane mist eliminator and a mesh mist eliminator, but no coalescer filters thus should display equivalent performance in terms of lubricant separation and superior performance with respect to pressure (due to a lack of pressure drop) as does a separator having coalescer filters using a conventional lubricant. The compressor system having no coalescer filters using a smokeless lubricant will thus exhibit greater efficiency with about the same entrainment of lubricant.

EXAMPLE 2

Figure 5:
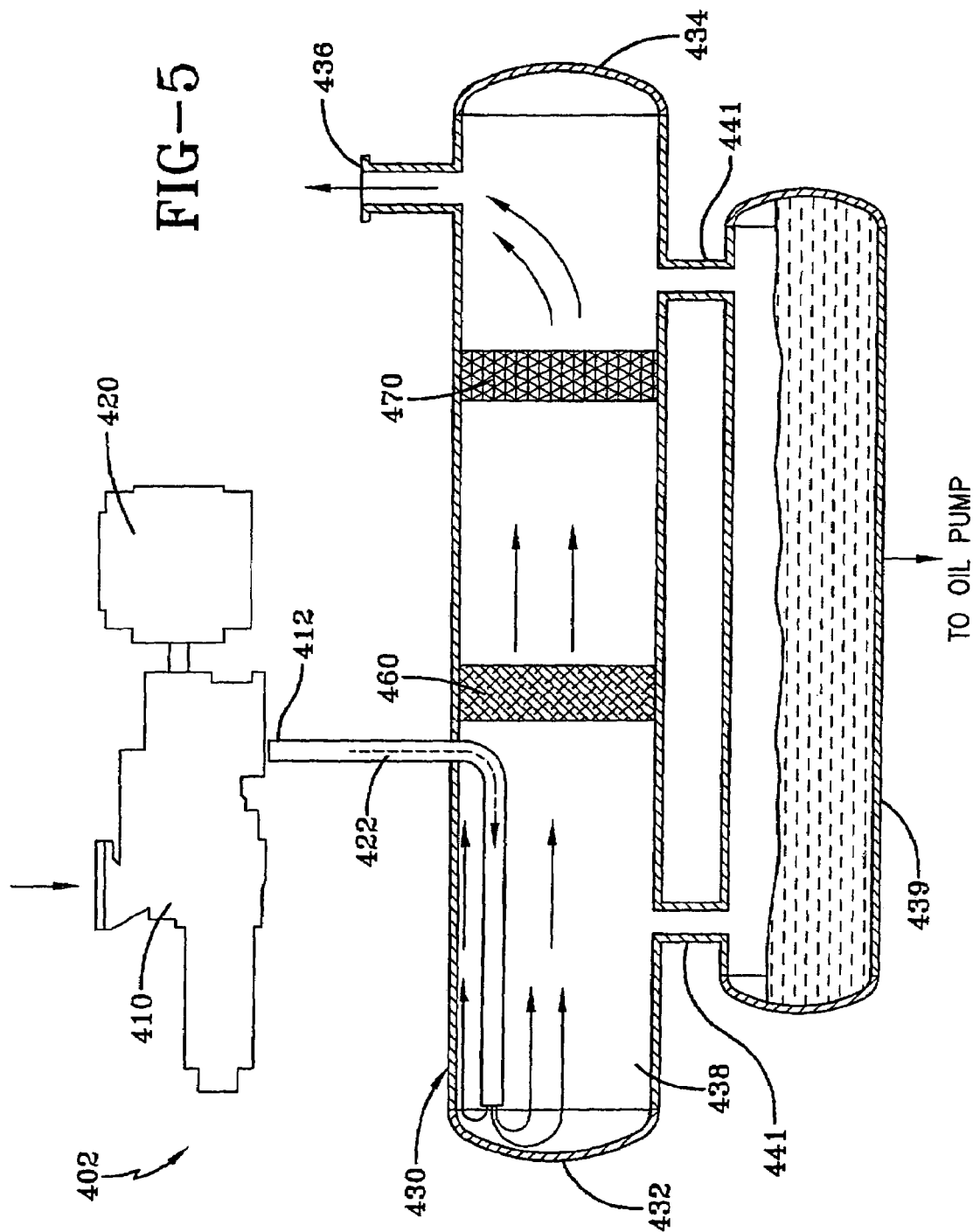
FIG. 5 is a schematic of a compressor system of the present invention utilizing a lubricant separator having a separate lubricant reservoir and without a coalescer portion, for separating smokeless oil from the gas stream.

A second embodiment of the present invention designed to operate with "smokeless" lubricant is set forth in FIG. 5. This design is similar to the design set forth in FIG. 3, except that the reservoir for the agglomerated fluid is external to the separator. A schematic of a portion of an existing screw compressor of the present invention 402 shows the compressor 410, the motor 420 which may be integral with compressor 410 and a separator 430, which eliminates the third stage coalescer portion 40 utilized in the prior art practice. Compressed gas with entrained lubricant exit compressor discharge port 412 and are carried by conduit 422 into separator 430. Separator 430 is a horizontal separator and includes a first head 432, a second head 434, and a discharge port 436. Within separator are a vane mist eliminator 460 and a mesh mist eliminator 470. Compressed fluid traveling at high velocity entering the separator through conduit 422 exits the conduit as in the prior art design. As it expands on exiting the conduit, the fluid undergoes a velocity drop. This high pressure fluid then strikes a barrier, here first head 432 and undergoes a direction change as shown, again as in the prior art design.

A portion of the entrained lubricant, agglomerated as a result of contact with first head 432, separates and flows into the bottom portion of separator 438 and then into an external reservoir 439. As shown in FIG. 4, reservoir 439 is positioned below separator 430. In this design, although it is not necessary, the bottom of separator 430 may include a slight slope toward conduit(s) 441. Conduits 441 connect external reservoir 439 with separator 430, and the slope facilitates the movement of the agglomerated fluid from separator 430 to external reservoir 439 via gravity. A check valve may be included in conduits 441 to prevent the backflow of lubricant from external reservoir 439 to separator 430. Alternatively, an external reservoir may be located adjacent or above the separator, and agglomerated lubricant can be cycled to the reservoir, such as by pumping or gravity draining when the lubricant level reaches a predetermined level within separator 439, such as by activation of a float valve. As in the embodiment of FIG. 3, an aerosol does not form with "smokeless lubricants."

The lubricant is returned from the reservoir 439 to compressor 410 where is lubricates the bearings and other moving parts. The lubricant is filtered, cooled and returned to the main compressor. The benefit of an external reservoir is that the separator can be made smaller. This is an advantage when the space for installing a separator is limited, but there is space for installing a remotely located external reservoir. Of course, the fabrication of a second independent structure entails additional manufacturing and raw materials costs. These costs are not typically a factor when installation space is at a premium, such as in marine applications.

EXAMPLE 3

Figure 6:
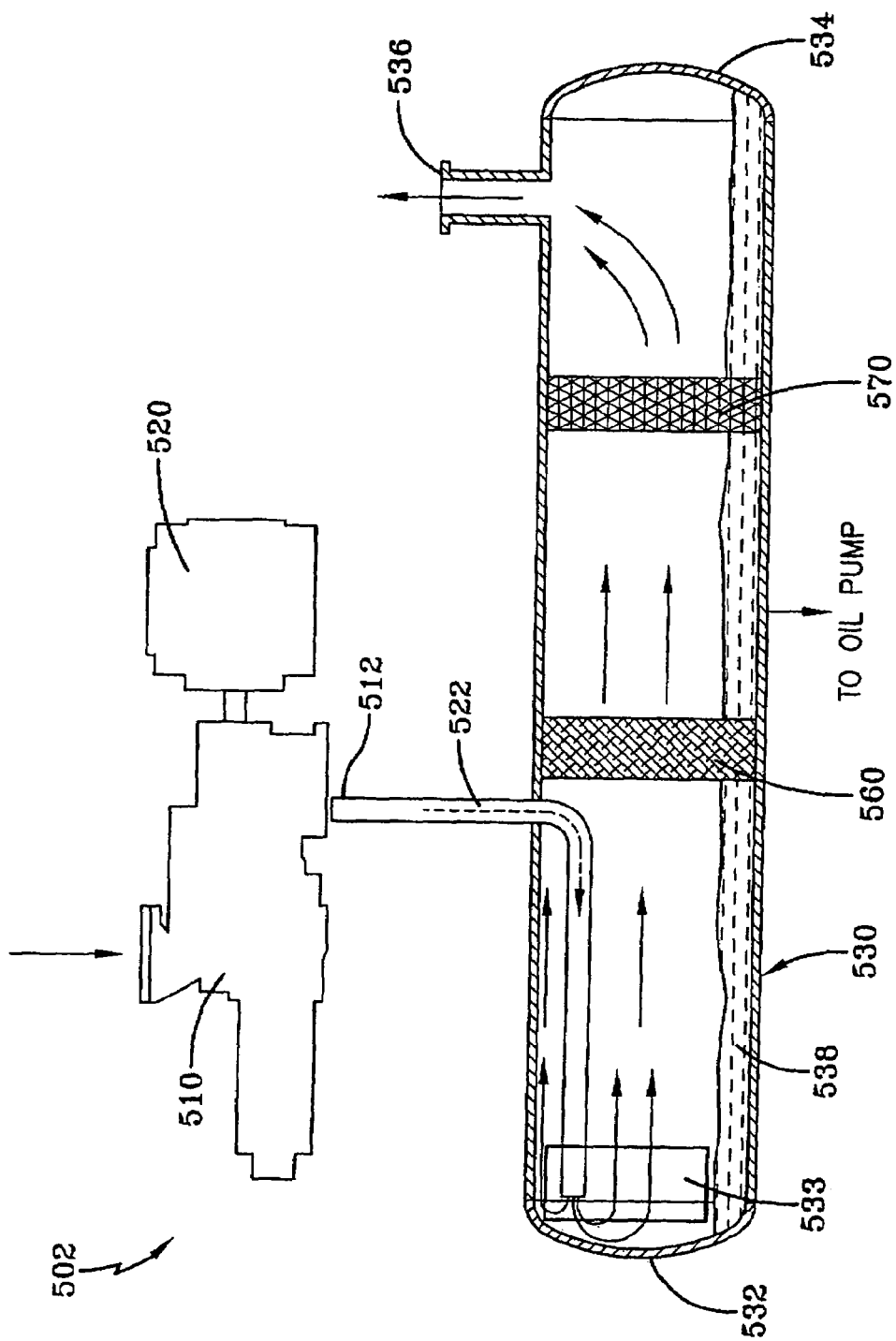
FIG. 6 is a schematic of a compressor system of the present invention utilizing a lubricant separator having a first stage centrifugal separator and without a coalescer portion, for separating smokeless oil from the gas stream.

A third embodiment of the present invention designed to operate with "smokeless" lubricant is set forth in FIG. 6. This design is similar to the design set forth in FIG. 3, except that compressed fluid traveling at a high velocity upon entering separator 530 after leaving conduit 522 passes through a centrifugal separator 533 positioned immediately adjacent the conduit exit within separator 530. A schematic of a portion of an existing screw compressor of the present invention 502 shows the compressor 510, the motor 520 which may be integral with compressor 510 and a separator 530, which eliminates the third stage coalescer portion 40 utilized in the prior art practice. Compressed fluid comprising refrigerant and entrained lubricant exits compressor discharge port 512 and is carried by conduit 522 into separator 530. Separator 530 is a horizontal separator and includes a first head 532, a second head 534, and a discharge port 536. Compressed fluid traveling at high velocity entering separator through conduit 522 exits the conduit as in the prior art design. As it expands on exiting the conduit, the fluid undergoes a velocity drop. This high pressure fluid then strikes a barrier, here first head 432 and undergoes a direction change, and, as shown, immediately is directed into centrifugal separator 533. Centrifugal separator 533 is comprised of a series of fixed, arcuate vanes radially mounted with respect to a centerline of separator 530, the centerline extending from first head 532 to second head 534. Some to the fluid entering the centrifugal separator agglomerates on the vanes and drops by gravity to reservoir 538. Although this FIG. 6 depicts an internal reservoir, it will be understood by those skilled in the art that an external reservoir such as set forth in Example 2 is also contemplated in this embodiment.

The arcuate vanes of centrifugal separator impart a spin to the fluid as the fluid passes through them. The centrifugal separator 533 has an inertial effect on the fluid passing through it. The velocity of the fluid stream is substantially constant, and centrifugal force will cause droplets having a higher momentum, that is to say, a larger size, to be removed from the stream and thereby separated. A centrifugal separator alters the direction of the droplets in the fluid flow, but the fluid stream exiting such a separator does not incur a substantial loss of velocity. In addition, the swirl or spin can be designed to cause the fluid exiting the centrifugal separator 533 to impact against the walls of separator 530. This will cause additional droplets to agglomerate and fall by gravity to reservoir 538. Depending upon the effectiveness of the centrifugal separator in removing the lubricant droplets from the stream, it may be possible to remove vane mist eliminator 560 from separator 530. Mesh mist eliminator 570 remains as a component of separator 560 in order to separate droplets down to about 5 microns in size. However, the elimination of the vane mist eliminator could provide a further reduction in the size of separator 530. The return of lubricant to compressor 510 and the flow of refrigerant gas through discharge port to other portions of the compression system remains unchanged in this embodiment.

EXAMPLE 4

Figure 7:
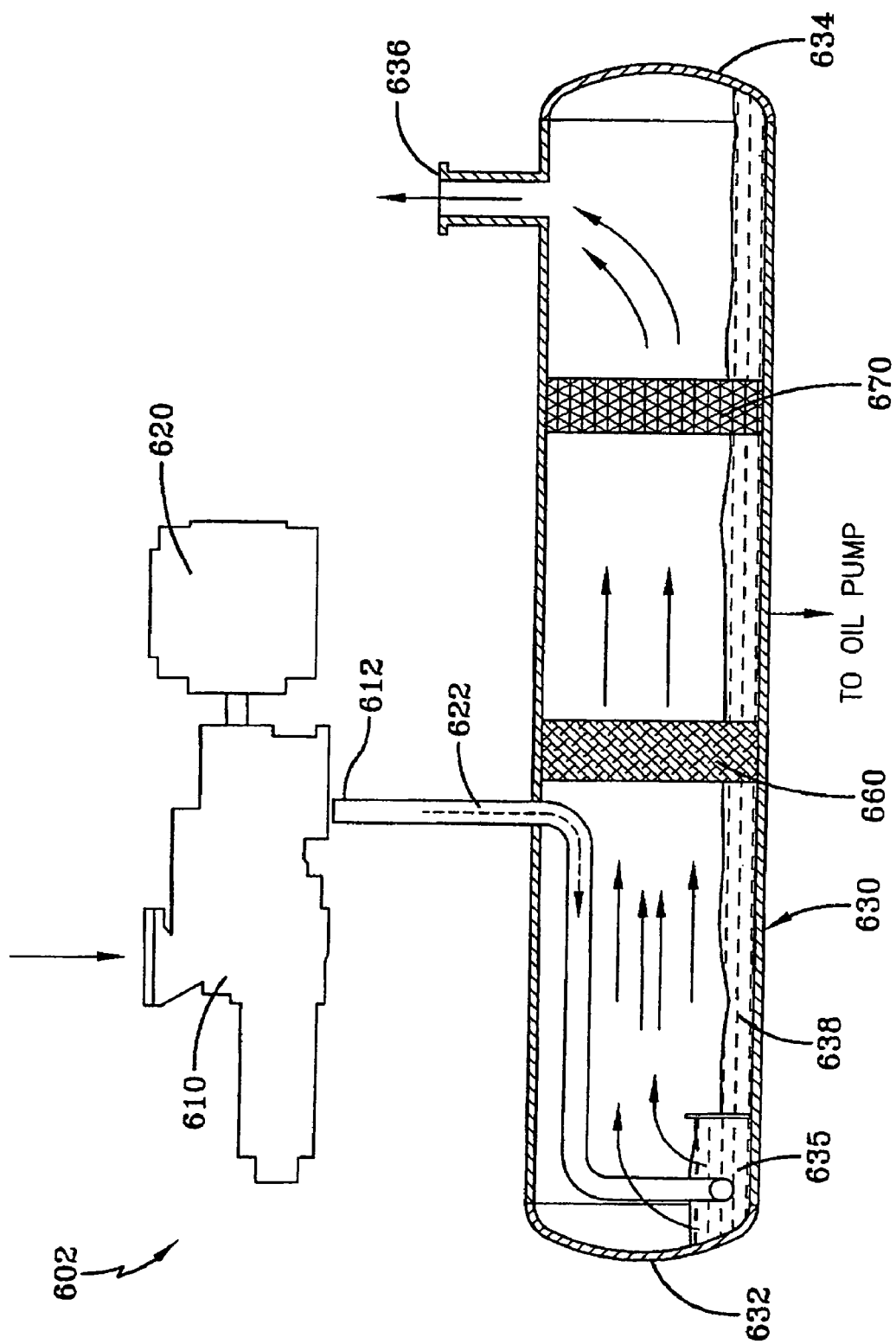
FIG. 7 is a schematic of a compressor system of the present invention utilizing a lubricant separator that passes the refrigerant gas through a lubricant pool and without a coalescer portion for separating smokeless oil from the gas stream.

Another variation of the present invention designed to operate with "smokeless" lubricant is set forth in FIG. 7. This design is similar to the design set forth in FIG. 2, except that conduit 622 carrying compressed fluid traveling at a high velocity enters separator 630 but extends downward into a pool of lubricant of preselected height, the exit port of conduit 622 extending a preselected distance below the surface of the lubricant pool. The fluid, upon leaving conduit 622, passes into lubricant pool 635 within separator 630. Although the fluid's velocity is reduced on exit from conduit 622, the fluid still has substantial velocity. The fluid forms additional droplets as it passes into and through the lubricant pool, but these droplets, because of the agglomeration characteristics of the lubricant, are sufficiently large so as to be readily removable from the fluid stream in a later stage within the separator. The advantage of this embodiment is achieved as any aerosol in the fluid stream contacts lubricant fluid in the lubricant pool as it exits the conduit within separator 630, the aerosol agglomerating into larger droplets or into the lubricant pool. Again, the schematic shows a portion of an existing screw compressor of a system 602, depicting the compressor 610, the motor 620 which may be integral with compressor 610 and the separator 630. Separator 630 includes a vane mist eliminator 660 and mesh mist eliminator 670 to remove entrained droplets in the fluid stream as the stream passes through separator 630 to discharge port 636. Agglomerated lubricant flows by gravity to the bottom of separator 638 which acts as a reservoir from which the lubricant can be cycled back to lubricate the moving parts of the compressor, as in the other embodiments.

EXAMPLE 5

Figure 8:
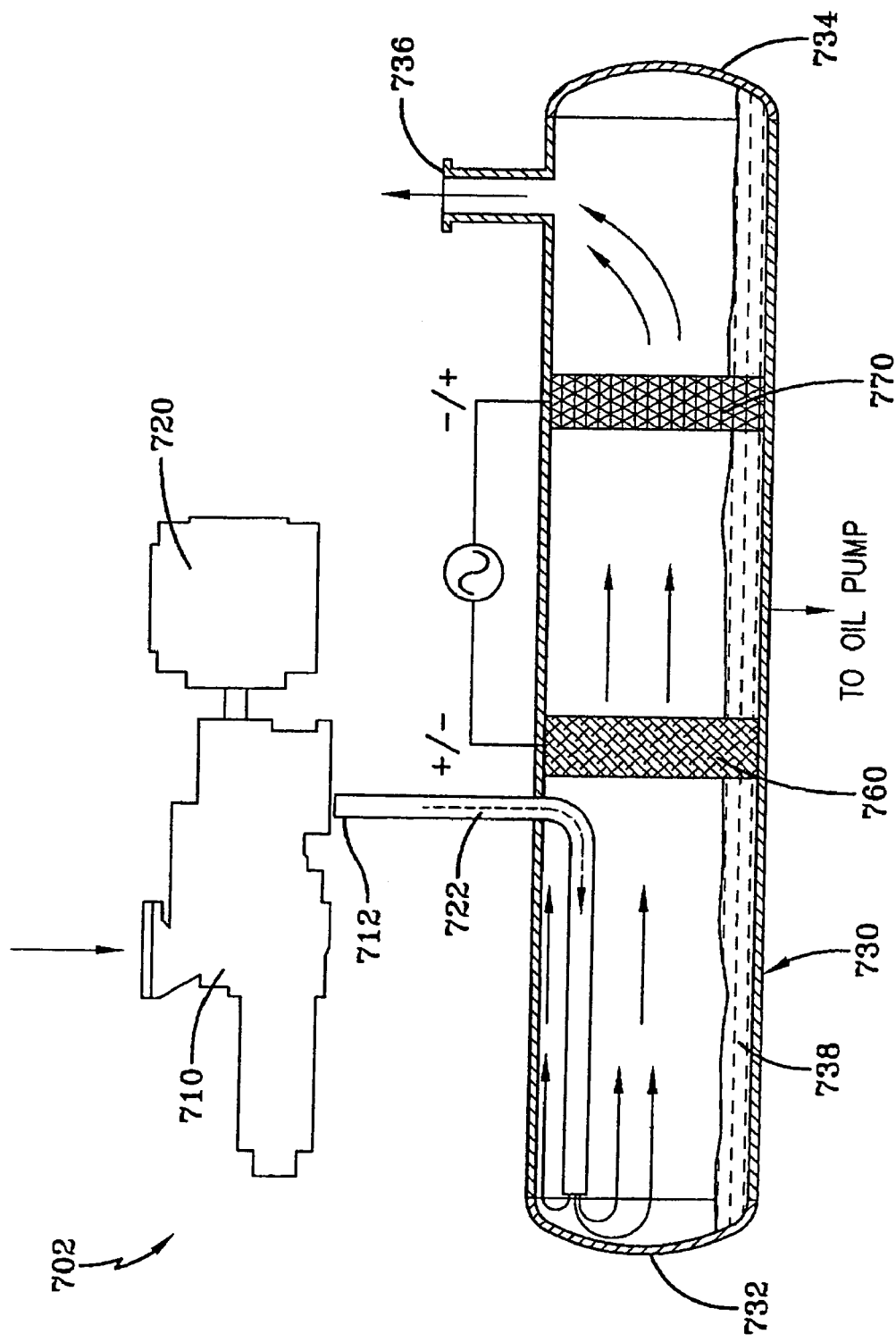
FIG. 8 is a schematic of a compressor system of the present invention utilizing a lubricant separator having an electric field for charging lubricant particles and without a coalescer portion for separating smokeless oil from the gas stream.

A fifth embodiment of the present invention designed to operate with "smokeless" lubricant is set forth in FIG. 8. The separator 730 is substantially mechanically identical in structure and operation to separator 230 depicted in FIG. 3. A portion of an embodiment of the screw compressor system 702 shows the compressor 710, the motor 720 which may be integral with compressor 710 and a separator 730. The third stage coalescer portion 40 of a separator as utilized in the prior art practice has been eliminated. Compressed gas and entrained lubricant, which in this embodiment is ionizable, exits compressor discharge port 712 and is carried by conduit 722 into separator 730. Typically, lubricants and their additives are readily ionizable. Separator 730 is a horizontal separator and includes a first head 732, a second head 734, and a discharge port 736. Within the separator are an optional vane mist eliminator 760 and a mesh mist eliminator 770. Compressed gas with entrained lubricant traveling at high velocity entering separator through conduit 722 exits the conduit as in the prior art design. As it expands on exiting the conduit, the fluid undergoes a velocity drop. This high pressure fluid then strikes a barrier, here first head 732, and undergoes a direction change as shown, again as in the prior art design. A portion of the entrained lubricant, agglomerated as a result of contact with first head 732 separates into a bottom portion of separator 738. Although droplets are entrained in the remaining lubricant stream, an aerosol does not form with "smokeless lubricants." The separator 730 includes an optional vane mist eliminator 760 and a mesh mist eliminator 770 in the second stage. In this embodiment, a voltage potential is developed within the second stage, here between the optional vane mist eliminator 760 and the mesh mist eliminator 770. Lubricant droplets passing through vane mist eliminator 760 are charged either positively or negatively, while the compressed gas is not affected by the field. While the mesh mist eliminator performs its function in condensing droplets, the charged lubricant droplets are attracted by the oppositely charged mesh mist eliminator to further improve the removal of the entrained droplets from the gas stream.

While the vane mist eliminator 760 and the mesh mist eliminator 770 are convenient existing structures for applying the electrical potential, the embodiment is not limited to application of the potential between these two structures. The concept set forth is to electrically charge ionizable lubricant droplets in the separator and to utilize an oppositely charged structure to remove the droplets from the fluid stream before the fluid stream exits the separator through discharge port 736. Thus, any other structures that can effectively ionize the droplets can be used. These may be separately added structures or they may be existing structures. For example, an electrical potential between the exit point of the fluid stream from conduit 722 and an added (not shown) structure downstream of mesh mist eliminator 770, between mesh mist eliminator 770 and discharge port 736, may be used to charge and separate droplets not separated in stages 1 or 2. Preferably, the potential is applied between the vane mist eliminator and the mesh mist eliminator or mesh mist eliminator and discharge port so that small droplets remaining in the fluid stream can be charged and removed. The potential developed must be sufficient to charge a large number of rapidly moving droplets. A potential of at least 500 volts, and preferably about 1000 volts, is required for a standard screw compressor Care also must be taken to avoid injury to personnel, and eliminate the possibility of accidents. Thus, the structures that develop the potential must be very carefully electrically isolated from the remainder of the separator. Also, arcing must be avoided, so the use of non-arc electronics is preferred.

EXAMPLE 6

Figure 10:
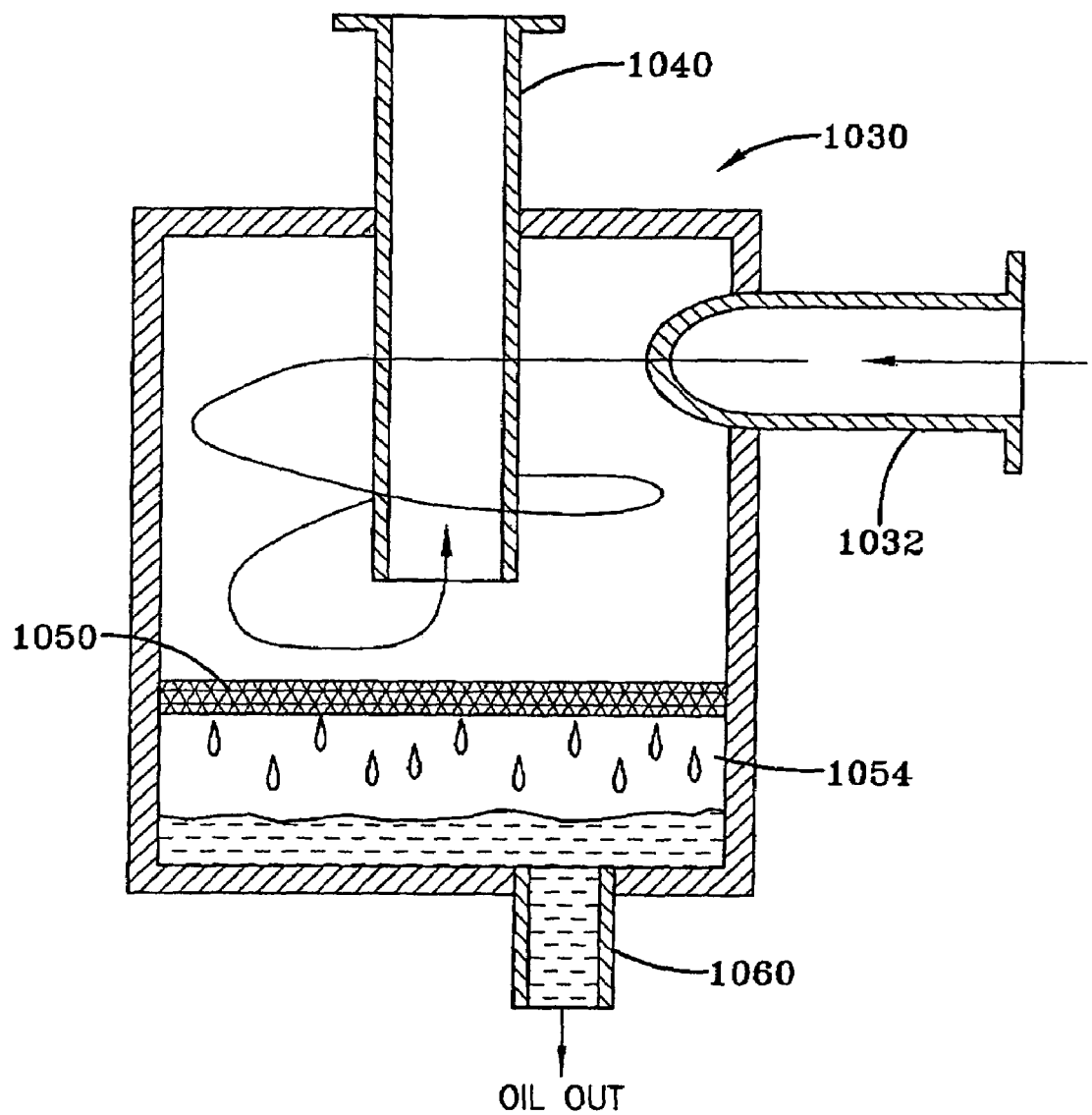
FIG. 10 is a schematic of a compressor system of the present invention utilizing a vertical separator having a mesh mist eliminator.

FIG. 10 depicts one vertical separator arrangement designed for use with smokeless lubricants. The separator 1030 is a cylindrical vessel with its axis in a substantially vertical position. Compressed gas with entrained lubricant from a compressor (not shown) enters the cylinder through a conduit 1032. The conduit 1032 is positioned substantially perpendicular to the axis of the cylinder so that the compressed gas with entrained lubricant, on entering tangentially to the cylinder wall, will have a swirl imparted. A gas discharge port 1040 extends downward into the cylinder above a collection structure 1050, which may be a mesh mist eliminator, as shown, or vane mist eliminator. Immediately below the collection structure, which in the preferred embodiment is a mesh mist eliminator, is a sump 1054 for collection of lubricant. A discharge pipe 1060 at the bottom of the sump 1054 is connected to the inlet of the compressor to transport the collected lubricant back to the compressor. As the compressed gas and entrained lubricant enter the cylindrical vessel tangentially, the fluid contacts the wall. The velocity of the fluid will be slowed by the contact with the wall, and lubricant droplets agglomerated on the cylindrical wall will fall to sump 1054. The swirl imparted by the cylindrical wall will cause additional droplets to be removed from the gas stream due to centrifugal force as they agglomerate into a critical size. As the compressed gas and entrained fluid move downward, larger particles will also be separated by gravity upon reaching a critical size. As the compressed gas and entrained lubricant are drawn downward toward the gas discharge port 1040, the gas and lubricant will contact collection structure 1050, which is positioned adjacent gas discharge port 1040 so that the gas and lubricant will contact it, yet sufficiently distant so as not to impede the flow of gas into port 1040, causing additional lubricant to be agglomerated on the surface of collection structure 1050 where it falls into sump 1054. The third stage coalescer portion of a separator as utilized in the prior art practice has been eliminated. This arrangement is but one arrangement for a vertical separator to separate compressed gas and entrained lubricant. The collection structure 1050 can be placed in any location within the cylinder, even at the entrance of port 1040. The collection structure may be a vane mist eliminator radially oriented within the swirling gas stream or any combination of vane mist eliminator and mesh pad eliminator.

The beneficial aspects of the present invention have been set forth above with respect to screw compressors such as are used in screw water chillers or screw compressors for natural gas compression and the like. In these screw compressors, the smokeless lubricant prevents the aerosolizing of the lubricant so that oil droplets can agglomerate as larger size particles, due to the unique agglomerating properties of the lubricant, which may be the result of surface tension effects and molecular attraction, and can be removed from the gas stream without the use of a coalescer portion, described herein as a third stage of the separator, thereby reducing the cost and size of the separator, eliminating the need for maintenance of the coalescer portion and associated requirements for access to the coalescer portion and the problems associated with providing such access as previously discussed.

While any lubricant that meets the requirements set forth above can be used, a suitable and preferred "smokeless" lubricant is available from CPI of Midland, Michigan. This "smokeless" lubricant is known to be a mineral-based oil with unknown polymeric additives designed for use with an ammonia-based refrigerant commercially available as FRICK #9 to provide the "smokeless" characteristics. However, these additives can be used with other mineral oils and POE oils such as oils identified in the art as York "C", York "H", York "K" and the like to create a "smokeless" lubricant. Another example of a suitable "smokeless" lubricant available from CPI of Midland, Michigan is a polyol ester-based (POE) oil from technical grade pentaerythritol esterified with linear C7, C8, C10 and 3,5,5-trimethylhexanoic carboxylic acids. This oil has an iso viscosity of 68. One of the antismoke additives, 1% treat, is ethylene-vinyl ester copolymer supplied as FP-0111091 by Functional Products. This POE lubricant is designed for use with refrigerant 134a, commercially available as Frick #13.

In addition to being compatible with the refrigerant, the surface tension of the lubricant must be such that the lubricant does not form an aerosol when compressed as a fluid with refrigerant, or if it does form an aerosol, it quickly coalesces to form droplets greater than 0.6 microns and preferably greater than submicron (1 micron and larger). These droplets can then agglomerate on an appropriate surface without the necessity of reducing the velocity of the compressed gas, as is typical when passing the compressed gas through a fine fiber filter. In addition, if the lubricant is to be used with a refrigerant in an embodiment such as shown in Example 5 of FIG. 7, the lubricant must be ionizable, while the refrigerant must be non-ionizable. The refrigerant and gas should be non-explosive and non-combustible.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:
1. A liquid/gas separator for use with a compressor, the liquid/gas separator comprising:
   a substantially cylindrically shaped vessel having a first end portion and an opposed second end portion, a cylindrical shell extending between the end portions, an inlet port, the inlet port opening into the vessel at a first location and a discharge port at a second location;

a conduit for receiving the discharge flow of fluid from the compressor, the fluid comprising a mixture of an entrained lubricant and a compressed gas and directing the fluid to the inlet port of the vessel;

a first structure having a surface within the vessel proximate to the inlet port to change a direction of the flow of fluid as it exits the inlet port, the first structure agglomerating droplets of lubricant on its surface, the agglomerated drops accumulating by gravity at a bottom of the vessel, the bottom of the vessel acting as a sump;

at least one coalescing structure positioned within a fluid path of the fluid before the fluid reaches an outlet port, the at least one coalescing structure comprising a material inert to the compressed gas and the lubricant, the fluid passing over the surface of the coalescing structure to coalesce remaining droplets of lubricant of a size of about 5 microns and larger, the remaining fluid being compressed gas substantially free of lubricant droplets, the compressed gas passing to the discharge port of the vessel, the vessel further characterized by the absence of fiber coalescing filters between the at least one coalescing structure and the discharge port and whereby the compressed gas includes less than about 700 ppm entrained lubricant; and a centrifugal separator between the first structure and the at least one coalescing structure, so that a stream of the fluid is directed into the centrilfugal separator after having undergone a change in direction of flow.

2. The liquid/gas separator of claim 1 wherein the centrifugal separator further comprises a plurality of fixed, arcuate vanes radially mounted with respect to a centerline of the centrifugal separator, the arcuate vanes agglomerating droplets of fluid on vane surfaces and imparting a spin to the fluid stream so that larger drops are removed from the fluid stream by a centrifugal force imparted by the spin.

3. The liquid/gas separator of claim 1 wherein the first structure having a surface within the vessel to change the direction of fluid flow is an internal wall of the cylindrical shell of the vessel.

4. The liquid/gas separator or claim 1 wherein the first structure having a surface within the vessel to change the direction of fluid flow is an internal wall of one of the end portions of the vessel.

5. The liquid/gas separator of claim 1 wherein the outlet port is in fluid communication with the bottom of the vessel acting as a sump so that agglomerated drops of lubricant collect to form a lubricant pool in the sump of the separator for providing lubricant to the compressor.

6. A liquid/gas separator for use with a compressor, the liquid/gas separator comprising:

a substantially cylindrically shaped vessel having a first end portion and an opposed second end portion, a cylindrical shell extending between the end portions, an inlet port, the inlet port opening into the vessel at a first location and a discharge port at a second location;

a conduit for receiving the discharge flaw of fluid from the compressor, the fluid comprising a mixture of an entrained lubricant and a compressed gas and directing the fluid to the inlet port of the vessel;

a first structure having a surface within the vessel proximate to the inlet port to change a direction of the flow of fluid as it exits the inlet port, the first structure agglomerating droplets of lubricant on its surface, the agglomerated drops accumulating by gravity at a bottom of the vessel, the bottom of the vessel acting as a sump; and a coalescing structure positioned within a fluid path of the fluid before the fluid reaches an outlet port so as to coalesce remaining droplets of lubricant of a size of about 5 microns and larger, the remaining fluid being compressed gas substantially free of lubricant droplets, the compressed gas passing to a discharge port of the vessel, the vessel further chacterized by the absence of fiber coalescing filters between the coalescing structure and the discharge port and whereby the compressed gas include less than about 700 ppm entrained lubricant, wherein the coalescing structure includes a centrifugal separator and a mesh mist eliminator, so that the stream of fluid directed into the centrifugal separator after having undergone a the change in direction of flow then is directed into the mesh mist eliminator, the centrifugal separator comprising a plurality of fixed, arcuate vanes radially mounted with respect to a centerline of the centrifugal separator, the arcuate vanes agglomerating some droplets at fluid on vane surface and imparting a spin to the fluid stream so that larger drops are removed from the fluid stream by a centrifugal force imparted by the spin.

7. The liquid/gas separator of claim 6 wherein the first structure having a surface within the vessel to change the direction of fluid flow is an internal wall of the cylindrical shell of the vessel.

8. The liquid/gas separator of claim 6 wherein the first structure having a surface within the vessel to change the direction of fluid flow is an internal wall of one of the end portions oh the vessel.

9. The liquid/gas separator of claim 6 wherein the outlet port is in fluid communication with the bottom of the vessel acting as a sump so that agglomerated drops of lubricant collect to form a lubricant pool in the sump of the separator for providing lubricant to the compressor.

10. A liquid/gas separator for use with a compressor, the liquid/gas separator comprising:

a substantially cylindrically shaped vessel having a first end portion and an opposed second end portion a cylindrical shell extending between the end portions, an inlet port, the inlet port opening into the vessel at a first location, a discharge port at a second location and an outlet port;

a first structure having a surface within the vessel proximate to the inlet port to change a direction of a flow of fluid from the compressor as it exits the inlet port, the fluid comprising a mixture of an entrained lubricant and a compressed gas, the first structure separating lubricant from the gas by agglomerating droplets of lubricant on its surface, the agglomerated drops accumulating by gravity at a bottom of the vessel, the bottom of the vessel acting as a sump; and a coalescing structure, wherein the coalescing structure is a mesh mist eliminator, mesh mist eliminator being a coarse mesh screen of a material inert to the compressed gas and lubricant, positioned within the fluid path to coalesce remaining droplets of lubricant of a size of about 5 microns and larger before the fluid reaches the discharge port, the remaining fluid being compressed gas substantially free of lubricant droplets, the compressed gas passing to the discharge port of the vessel, the vessel further characterized by the absence of fiber coalescing filters between the coalescing structure and the discharge port and whereby the compressed gas includes less than about 700 ppm entrained lubricant.

11. The liquid/gas separator of claim 10 further including a vane mist eliminator comprising a circumferential structure of airfoils in the flow path of the fluid before the fluid exits the vessel.

12. The liquid/gas separator or claim 11 wherein the airfoils are radially oriented with respect to the cylindrically shaped vessel.

13. The liquid/gas separator of claim 10 wherein the first structure having a surface within the vessel to change the direction of fluid flow is an internal wall of the cylindrical shell of the vessel.

14. The liquid/gas separator of claim 10 wherein the first structure having a surface within the vessel to change the direction of fluid flow is an internal wall of one of the end portions of the vessel.

* * * * *

UNITED STATES PATENT AND TRADEMARK OFFICE
CERTIFICATE OF CORRECTION

PATENT NO. : 7,032,410 B2  Page 1 of 1
APPLICATION NO. : 10/922526
DATED : April 25, 2006
INVENTOR(S) : Barratt et al.

It is certified that error appears in the above-identified patent and that said Letters Patent is hereby corrected as shown below:

Column 1, Line 8, "Oct. 10, 2002" should be -- Oct. 3, 2002 --.

Signed and Sealed this

Third Day of October, 2006

JON W. DUDAS
*Director of the United States Patent and Trademark Office*